US012142195B2

(12) United States Patent
Zhou et al.

(10) Patent No.: US 12,142,195 B2
(45) Date of Patent: Nov. 12, 2024

(54) DISPLAY PANEL, INTEGRATED CHIP AND DISPLAY DEVICE

(71) Applicant: Hubei Yangtze Industrial Innovation Center Of Advanced Display Co., Ltd., Wuhan (CN)

(72) Inventors: Qiyuan Zhou, Wuhan (CN); Wenxin Jiang, Wuhan (CN); Feng Qin, Wuhan (CN)

(73) Assignee: HUBEI YANGTZE INDUSTRIAL INNOVATION CENTER OF ADVANCED DISPLAY CO., LTD., Wuhan (CN)

( * ) Notice: Subject to any disclaimer, the term of this patent is extended or adjusted under 35 U.S.C. 154(b) by 0 days.

(21) Appl. No.: 18/128,188

(22) Filed: Mar. 29, 2023

(65) Prior Publication Data

US 2024/0221612 A1 Jul. 4, 2024

(30) Foreign Application Priority Data

Dec. 29, 2022 (CN) ......................... 202211711756.8

(51) Int. Cl.
*G09G 3/3266* (2016.01)
*G09G 3/00* (2006.01)
*G09G 3/32* (2016.01)

(52) U.S. Cl.
CPC ....... *G09G 3/32* (2013.01); *G09G 2310/0286* (2013.01)

(58) Field of Classification Search
CPC .................................................... G09G 3/3233
See application file for complete search history.

(56) References Cited

U.S. PATENT DOCUMENTS

2018/0308417 A1* 10/2018 Xie ...................... G09G 3/3266
2021/0407425 A1* 12/2021 Huang ................. G09G 3/3266

FOREIGN PATENT DOCUMENTS

CN 106251804 A 12/2016
CN 109243359 A 1/2019
CN 111696471 A 9/2020
CN 111710286 A 9/2020
CN 115206244 A 10/2022

(Continued)

OTHER PUBLICATIONS

The First Office Action for CN Application No. 202211711756.8, dated Jun. 27, 2024, 34 pages.

*Primary Examiner* — Nan-Ying Yang
(74) *Attorney, Agent, or Firm* — East IP P.C.

(57) ABSTRACT

The present application discloses a display panel, an integrated chip and a display device. The display panel includes a first display area and a second display area; a first drive circuit, including multi-stage first shift registers for receiving a first control signal and providing a first drive signal to pixel circuits of the first display area; and a second drive circuit, including multi-stage second shift registers for receiving a second control signal and providing a second drive signal to pixel circuits of the second display area, wherein a pulse change frequency of the first control signal is different from a pulse change frequency of the second control signal. According to the embodiment of the present application, drive circuits are performed on an area basis, and different display requirements of different display areas in the display panel can be flexibly realized.

20 Claims, 20 Drawing Sheets

(56) References Cited

FOREIGN PATENT DOCUMENTS

| | | | |
|---|---|---|---|
| CN | 115311980 | A | 11/2022 |
| CN | 115311996 | A | 11/2022 |
| KR | 20060059074 | A | 6/2006 |
| KR | 20160083791 | A | 7/2016 |
| KR | 20210063166 | A | 6/2021 |

* cited by examiner

DISPLAY PANEL, INTEGRATED CHIP AND DISPLAY DEVICE

CROSS-REFERENCE TO RELATED APPLICATION

This application is based on and claims priority to Chinese Patent Application No. 202211711756.8, filed on Dec. 29, 2022 and titled "DISPLAY PANEL, INTEGRATED CHIP AND DISPLAY DEVICE", which is incorporated herein by reference in its entirety.

TECHNICAL FIELD

The present application relates to the technical field of display, and in particular, to a display panel, an integrated chip and a display device.

BACKGROUND

As display panel technology continues to update, a display size of a display panel is designed to increase while different display areas may be designed to present different display contents at the same time. For example, the display panel may operate in separate screens, and an upper display area of the display panel displays a dynamic scene and a lower display area of the display panel displays a static scene.

Display functions or display effects required by different display areas of the display panel may be different, and how to differently design a drive circuit based on the display functions or display effects of different display areas in the display panel is a hot spot of research in a current stage of the art.

SUMMARY

Embodiments of the present application provide a display panel, an integrated chip and a display device.

In a first aspect, the embodiments of the present application provide a display panel including a first display area and a second display area; a first drive circuit, including multi-stage first shift registers for receiving a first control signal and providing a first drive signal to pixel circuits of the first display area; and a second drive circuit, including multi-stage second shift registers for receiving a second control signal and providing a second drive signal to pixel circuits of the second display area, wherein a pulse change frequency of the first control signal is different from a pulse change frequency of the second control signal.

Based on the same inventive concept, in a second aspect, the embodiments of the present application provide an integrated chip for providing a signal to the display panel of the first aspect of the embodiments, wherein the display panel includes: a first display area and a second display area; a first drive circuit, including multi-stage first shift registers for receiving a first control signal and providing a first drive signal to pixel circuits of the first display area; and a second drive circuit, including multi-stage second shift registers for receiving a second control signal and providing a second drive signal to pixel circuits of the second display area, wherein a pulse change frequency of the first control signal is different from a pulse change frequency of the second control signal; and the integrated chip provides at least one of the first control signal and the second control signal.

Based on the same inventive concept, in a third aspect, the embodiments of the present application provide a display device including the display panel of the first aspect of the embodiments.

BRIEF DESCRIPTION OF THE DRAWINGS

Other features, objects, and advantages of the present application will become more apparent from the following detailed description of non-limiting embodiments with reference to the drawings, wherein same or similar reference numbers refer to same or similar features, and the drawings are not drawn to an actual scale.

DETAILED DESCRIPTION

Figure 1:
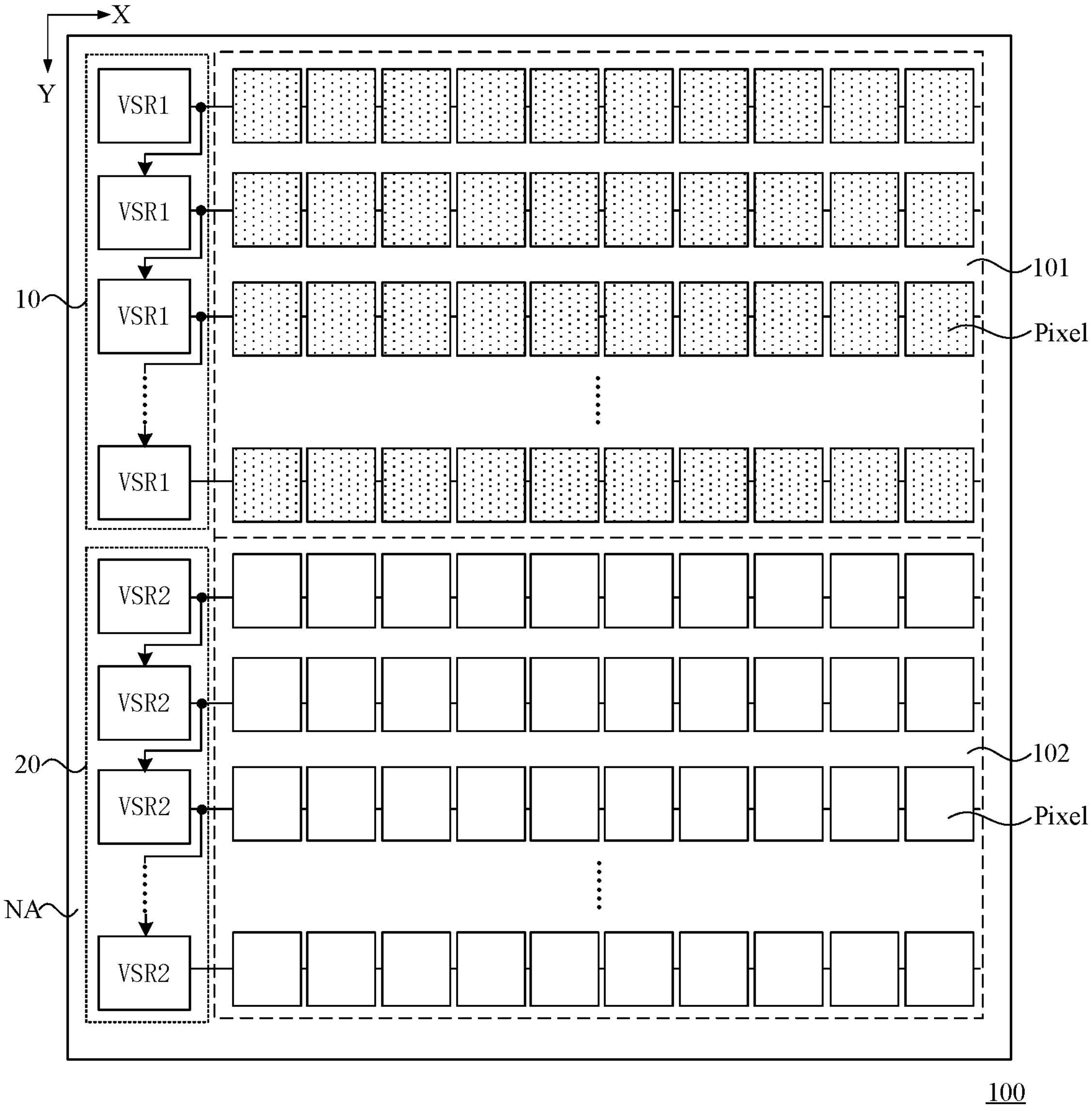
FIG. 1 illustrates a schematic diagram of a structure of a display panel according to an embodiment of the present application.

Features and exemplary embodiments of various aspects of the present application will be described in detail below, and in order to make objects, technical solutions and advantages of the present application more clear and apparent, the present application is further described in detail below in conjunction with the drawings and specific embodiments. It should be understood that specific embodiments described herein are only configured to interpret the present application, and are not configured to limit the present application. For those skilled in the art, the present application may be practiced without some of these specific details. The following description of embodiments is only intended to provide a better understanding of the present application by illustrating examples of the present application.

It should be noted that, relational terms herein such as "first" and "second", and the like, are only used to distinguish one entity or operation from another entity or operation, and do not necessarily require or imply any such actual relationship or order between these entities or operations. Furthermore, terms "comprising", "including", or any other variant thereof, are intended to cover a non-exclusive inclusion, such that a process, method, article, or apparatus including a series of elements includes not only those elements, but also other elements not expressly listed or elements inherent to such process, method, article, or apparatus. Without further restrictions, an element defined by a statement "comprises . . . " does not exclude an existence of additional identical elements in the process, method, article, or apparatus that comprises the element.

It should be understood that when describing a structure of a component, under a condition that one layer or region is referred to as being located "on" or "over" another layer or region, it may mean that the layer or region is directly located on another layer or region or that there are other layers or regions between the layer or region and another layer or region. Also, if the component is flipped, the layer or region will be located "under" or "below" another layer or region.

It should be understood that the term "and/or" as used herein is only an association relationship to describe associated objects, and means that there may be three relationships. For example, A and/or B may represent three cases: A alone, both A and B, and B alone. In addition, the character "/" as used herein generally indicates that associated objects are of an "or" relationship.

In embodiments of the present application, the term "connected" may mean that two components are directly connected, or that two components are connected via one or more other components.

It will be apparent to those skilled in the art that various modifications and variations can be made in the present application without departing from the spirit or scope of the present application. Thus, the present application is intended to cover modifications and variations of the present application falling within the scope of corresponding claims (technical solutions for which protection is claimed) and their equivalents. It should be noted that implementations provided in the embodiments of the present application can be combined with each other without contradiction.

As introduced in the background, display functions or display effects required by different display areas of a display panel may be different, and how to differently design a drive circuit based on the display functions or display effects of different display areas in the display panel is a hot spot of research in a current stage of the art.

Based on this, the embodiments of the present application provide a display panel, an integrated chip and a display device, and various embodiments of the display panel, the integrated chip and the display device will be described below with reference to the accompanying drawings.

The display panel according to the embodiments of the present application may be an Organic Light Emitting Diode (OLED) display panel, a micro light-emitting diode display panel, or other types of display panels.

FIG. 1 illustrates a schematic diagram of a structure of a display panel according to an embodiment of the present application. As shown in FIG. 1, a display panel 100 according to an embodiment of the present application may include a first display area 101 and a second display area 102. Pixel circuits Pixel are distributed in both the first display area 101 and the second display area 102, and the pixel circuits Pixel may be configured to drive light-emitting elements (not shown in FIG. 1) to emit light. In order to better distinguish areas to which the pixel circuits Pixel belong, different fill colors are used in FIG. 1 to represent the pixel circuits Pixel within the first display area 101 and the second display area 102. The pixel circuits Pixel may include transistors, capacitors, etc. and the transistors may be turned on or off under the control of a drive signal.

The display panel 100 may be provided with a first drive circuit 10 and a second drive circuit 20 corresponding to a first display area 101 and a second display area 102, respectively.

In particular, the first drive circuit 10 may include multi-stage first shift registers VSR1. The first drive circuit 10 is configured to receive a first control signal and to generate a first drive signal based on the first control signal. The first drive circuit 10 provides the generated first drive signal to the pixel circuits Pixel in the first display area 101, so that the transistors of the pixel circuits Pixel in the first display area 101 may be turned on or off under the control of the first drive signal.

The second drive circuit 20 may include multi-stage second shift registers VSR2. The second drive circuit 20 is configured to receive a second control signal and generate a second drive signal based on the second control signal. The second drive circuit 20 provides the generated second drive signal to the pixel circuits Pixel in the second display area 102, so that the transistors of the pixel circuits Pixel in the second display area 102 may be turned on or off under the control of the second drive signal.

Figure 2:
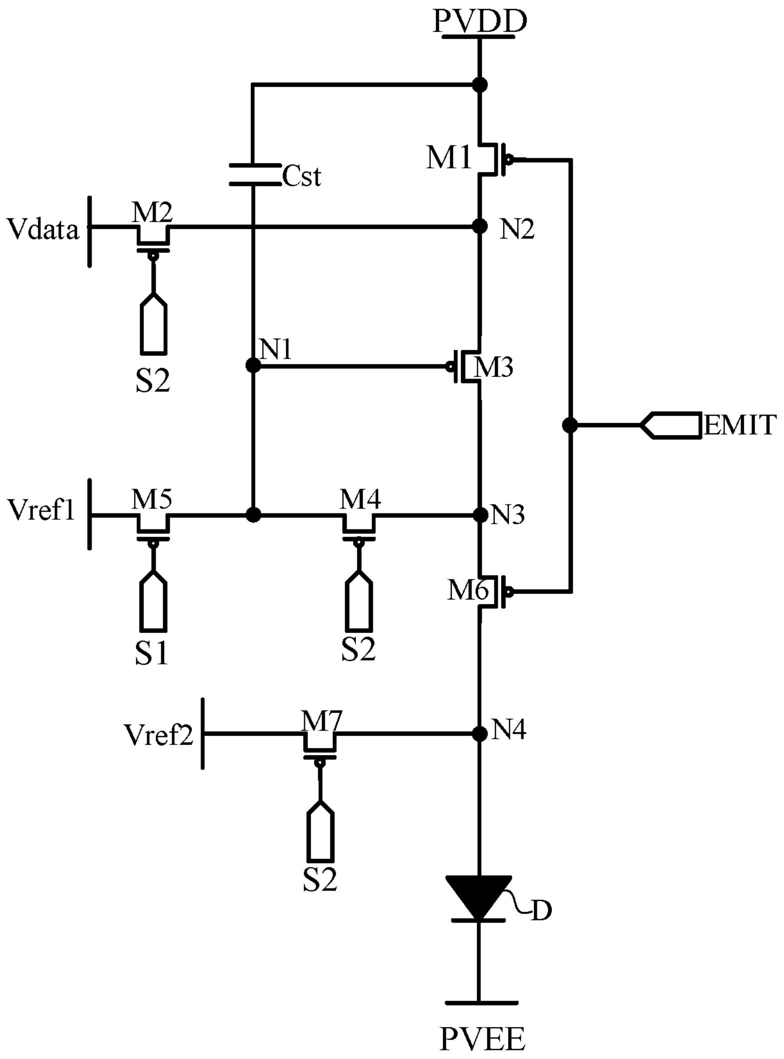
FIG. 2 illustrates a schematic diagram of a structure of a pixel circuit in a display panel according to an embodiment of the present application.
Figure 3:
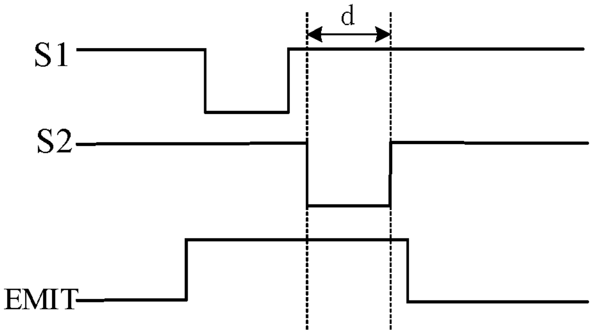
FIG. 3 illustrates a timing schematic diagram of FIG. 2.

For example, as shown in FIG. 2, each of the pixel circuits Pixel may include transistors M1-M7 and a storage capacitor Cst. S1 and S2 represent scanning signals, EMIT represents a light-emitting control signal, Vdata represents a data signal, PVDD represents a first power supply signal terminal, PVEE represents a second power supply signal terminal, Vref1 represents a reset signal, Vref2 represents an initialization signal, and D represents a light-emitting element. FIG. 3 is a timing schematic diagram of FIG. 2, and an operation process of the pixel circuit shown in FIG. 2 will be described below. A circuit structure of the pixel circuit shown in FIG. 2 is merely an example and is not intended to limit the present application.

As an example, the first drive circuit 10 and the second drive circuit 20 may be scanning drive circuits, so that types of the first drive signal and the second drive signal may be the scanning signals S1, S2, the first drive circuit 10 provides the scanning signals S1, S2 to the pixel circuits Pixel of the first display area 101, and the second drive circuit 20 provides the scanning signals S1, S2 to the pixel circuits Pixel of the second display area 102.

As another example, the first drive circuit 10 and the second drive circuit 20 may be light-emitting drive circuits, so that types of the first drive signal and the second drive signal may be the light-emitting control signal EMIT, the first drive circuit 10 provides the light-emitting control signal EMIT to the pixel circuits Pixel of the first display area 101, and the second drive circuit 20 provides the light-emitting control signal EMIT to the pixel circuits Pixel of the second display area 102.

In an embodiment of the present application, a pulse change frequency of the first control signal is different from a pulse change frequency of the second control signal.

Figure 4:
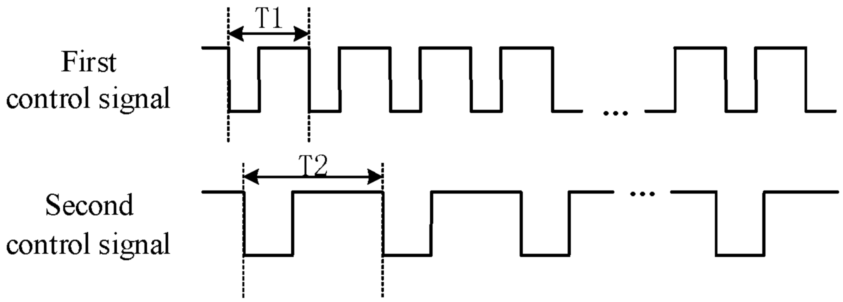
FIG. 4 illustrates a schematic diagram of control signals in a display panel according to an embodiment of the present application.

It will be appreciated that the first control signal and the second control signal are both pulse signals. As shown in FIG. 4, each of the first and second control signals may include alternating high levels and low levels. For example, a period of the first control signal is T1, the pulse change frequency of the first control signal may be understood as a number of times the first control signal completes a periodic change within a unit time (for example, within 1 second), and the pulse change frequency of the first control signal may be equal to 1/T1. Similarly, for example, a period of the second control signal is T2, the pulse change frequency of the second control signal may be understood as a number of times the second control signal completes a periodic change within a unit time (for example, within 1 second), and the pulse change frequency of the second control signal may be equal to 1/T2.

For example, the first control signal may have a pulse change frequency of 120 HZ and the second control signal may have a pulse change frequency of 60 HZ. As another example, the first control signal may have a pulse change frequency of 1 HZ and the second control signal may have a pulse change frequency of 90 HZ. These numbers are, of course, merely exemplary and are not intended to limit the present application.

With respect to the display panel according to the embodiments of the present application, for different display areas, drive circuits are designed in different areas. Specifically, the pixel circuits of the first display area are driven by the first drive circuit, and the pixel circuits of the second display area are driven by the second drive circuit. The first drive circuit receives the first control signal, and the second drive circuit receives the second control signal. Since the pulse change frequency of the first control signal is different from the pulse change frequency of the second control signal, the first drive signal generated by the first drive circuit is different from the second drive signal generated by the second drive circuit, and thus different display requirements of the first display area and the second display area can be flexibly implemented.

Referring to FIG. 1, the first drive circuit 10 and the second drive circuit 20 may be located in a non-display area NA of the display panel 100, and the non-display area NA may at least partially surround the first display area 101 and the second display area 102.

Figure 5:
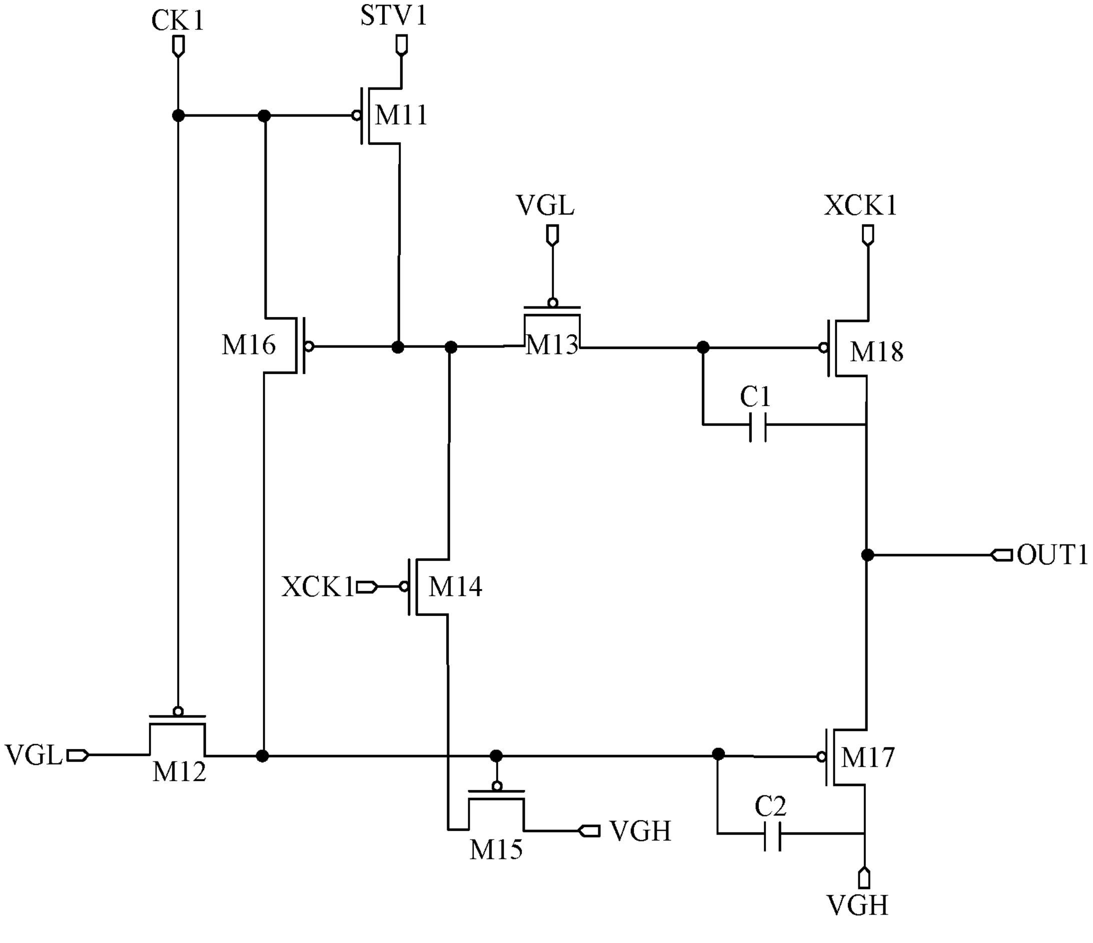
FIG. 5 illustrates a schematic diagram of a structure of a first shift register in a display panel according to an embodiment of the present application.

The control signals received by the first drive circuit 10 and the second drive circuit 20 may include different types of control signals, for example, the control signals received by both the drive circuits may include a trigger signal and a clock signal. For a better understanding of the control signals received by the first drive circuit 10 and the second drive circuit 20, as shown in FIG. 5, each of the first shift registers VSR1 may include transistors M11-M18 and capacitors C1, C2. In FIG. 5, STV1 represents a first trigger signal, CK1 represents a first sub-clock signal, XCK1 represents a second sub-clock signal, VGH represents a high-level signal, VGL represents a low-level signal, and OUT1 represents an output terminal of the first shift register VSR1.

Figure 6:
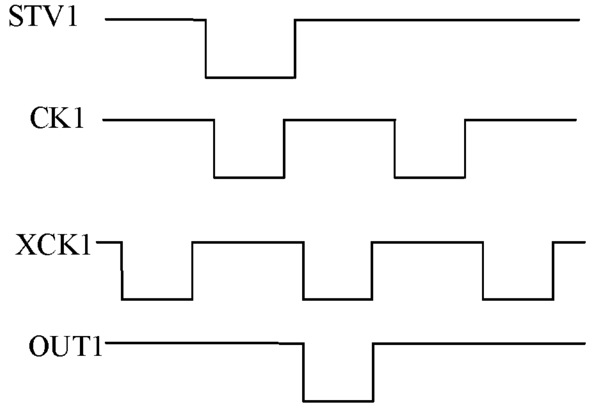
FIG. 6 illustrates a timing schematic diagram of FIG. 5.

The first control signal received by the first drive circuit 10 may include the first trigger signal STV1 and a first clock signal. Description herein is given by taking an example where the first clock signal may include the first sub-clock signal CK1 and the second sub-clock signal XCK1. An operation process of the first shift register VSR1 may be as shown in FIG. 6, and the output terminal OUT1 of the first shift register VSR1 may output the first drive signal under the control of the first trigger signal STV1 and the first clock signal.

It will be appreciated that a signal output at an output terminal of a previous stage of the first shift registers VSR1 may serve as the first trigger signal for a next stage of the first shift registers VSR1.

Figure 7:
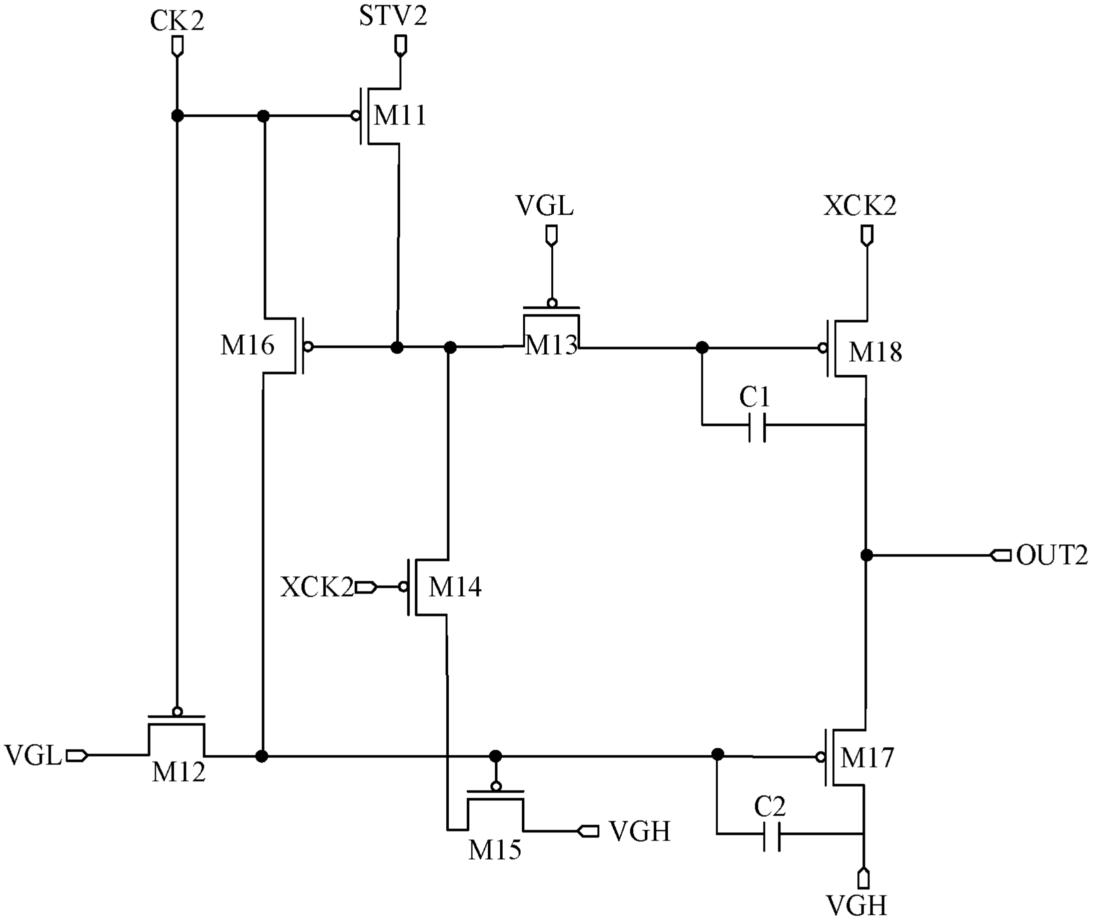
FIG. 7 illustrates a schematic diagram of a structure of a second shift register in a display panel according to an embodiment of the present application.

Circuit structures of the second shift registers VSR2 and the first shift registers VSR1 may be the same, with the difference that, as shown in FIG. 7, the second control signal received by the second drive circuit 20 may include a second trigger signal STV2 and a second clock signal, and description herein is given by taking an example where the second clock signal may include a third sub-clock signal CK2 and a fourth sub-clock signal XCK2. An operation process of the second shift registers VSR2 may be the same as the operation process of the first shift registers VSR1, and an output terminal OUT2 of each stage of the second shift registers VSR2 of the second drive circuit 20 may output the second drive signal under the control of the second trigger signal STV2 and the second clock signal.

It will be appreciated that a signal output at an output terminal of a previous stage of the second shift registers VSR2 may serve as the second trigger signal for a next stage of the second shift registers VSR2.

Optionally, the circuit structures of the first shift registers VSR1 and the second shift registers VSR2 may be different, and the first control signal and the second control signal are respectively output to realize different display requirements of the first display area 101 and the second display area 102.

Both a trigger signal and a clock signal may control an output of a shift register. For example, an active write of the trigger signal may control whether the shift register outputs or not, and the clock signal may determine a time at which the shift register outputs a signal. Thus, for the first drive circuit 10 and the second drive circuit 20, under a condition that at least one of the trigger signal and the clock signal are different, it may be achieved that the first drive signal provided by the first drive circuit 10 and the second drive circuit 20 are different.

As an example, a pulse change frequency of the first trigger signal STV1 and a pulse change frequency of the second trigger signal STV2 may be different.

As another example, a pulse change frequency of the first clock signal and a pulse change frequency of the second clock signal may be different. Specifically, a pulse change frequency of the first sub-clock signal CK1 and a pulse change frequency of the third sub-clock signal CK2 may be different, and a pulse change frequency of the second sub-clock signal XCK1 and a pulse change frequency of the fourth sub-clock signal XCK2 may be different.

As yet another example, the pulse change frequency of the first trigger signal STV1 and the pulse change frequency of the second trigger signal STV2 may be different, and the pulse change frequency of the first clock signal and the pulse change frequency of the second clock signal may be different. Specifically, the pulse change frequency of the first sub-clock signal CK1 and the pulse change frequency of the third sub-clock signal CK2 may be different, and the pulse change frequency of the second sub-clock signal XCK1 and the pulse change frequency of the fourth sub-clock signal XCK2 may be different.

Illustratively, the pulse change frequency of the first sub-clock signal CK1 and the pulse change frequency of the second sub-clock signal XCK1 may be the same, a rising edge of the first sub-clock signal CK1 and a rising edge of the second sub-clock signal XCK1 may be staggered in time, and a falling edge of the first sub-clock signal CK1 and a falling edge of the second sub-clock signal XCK1 may be staggered in time. Similarly, the pulse change frequency of the third sub-clock signal CK2 and the pulse change frequency of the fourth sub-clock signal XCK2 may be the same, a rising edge of the third sub-clock signal CK2 and a rising edge of the fourth sub-clock signal XCK2 may be staggered in time, and a falling edge of the third sub-clock signal CK2 and a falling edge of the fourth sub-clock signal XCK2 may be staggered in time. Herein, a rising edge may represent an instant when a signal changes from a low level to a high level, and a falling edge may represent an instant when a signal changes from a high level to a low level.

Further, in the case where the pulse change frequency of the first trigger signal STV1 and the pulse change frequency of the second trigger signal STV2 are different, the pulse change frequency of the first clock signal and the pulse change frequency of the second clock signal may be the same. Specifically, the pulse change frequencies of the first sub-clock signal CK1, the second sub-clock signal XCK1, the third sub-clock signal CK2 and the fourth sub-clock signal XCK2 may be the same.

Also, in the case where the pulse change frequency of the first clock signal CK1 and the pulse change frequency of the second clock signal CK2 are different, the pulse change frequency of the first trigger signal STV1 and the pulse change frequency of the second trigger signal STV2 may be the same.

As introduced above, different display areas of the display panel may have different display functions or display effects, for example, the first display area 101 and the second display area 102 may have different picture refresh frequencies. A picture refresh frequency may be equal to an effective data refresh frequency of the pixel circuits Pixel. For example, an effective data refresh frequency corresponding to the first display area 101 may be greater than an effective data refresh frequency corresponding to the second display area 102.

Specifically, the first display area 101 may include pixel circuits Pixel from row M to row N, the second display area 102 may include pixel circuits Pixel from row P to row Q, and an effective data refresh frequency of the pixel circuits Pixel from row M to row N may be greater than an effective data refresh frequency of the pixel circuits Pixel from row P to row Q. $M<N$, $P<Q$, and M, N, P, Q are all positive integers. For example, a number of rows of pixel circuits included in the first display area 101 and a number of rows of pixel circuits included in the second display area 102 may be equal, i.e. $N-M=Q-P$. As another example, the number of rows of pixel circuits included in the first display area 101 may be greater than the number of rows of pixel circuits included in the second display area 102, i.e. $N-M>Q-P$. As another example, the number of rows of pixel circuits included in the first display area 101 may be less than the number of rows of pixel circuits included in the second display area 102, i.e. $N-M<Q-P$.

In addition, a meaning of the effective data refresh frequency will be described below.

In the case where the effective data refresh frequency corresponding to the first display area 101 is larger than the effective data refresh frequency corresponding to the second display area 102, in some examples, the pulse change frequency of the first trigger signal STV1 may be larger than the pulse change frequency of the second trigger signal STV2. In other examples, the pulse change frequency of the first clock signal may be greater than the pulse change frequency of the second clock signal. In still other examples, the pulse change frequency of the first trigger signal STV1 is greater than the pulse change frequency of the second trigger signal STV2, and the pulse change frequency of the first clock signal is greater than the pulse change frequency of the second clock signal.

The specific case where the pulse change frequency of the first clock signal is greater than the pulse change frequency of the second clock signal may include: the pulse change frequency of the first sub-clock signal CK1 is greater than the pulse change frequency of the third sub-clock signal CK2, and the pulse change frequency of the second sub-clock signal XCK1 is greater than the pulse change frequency of the fourth sub-clock signal XCK2.

It can be appreciated that since the pulse change frequency of the second trigger signal and/or the second clock signal received by the second drive circuit is relatively low, a frequency of voltage flipping of the second trigger signal and/or the second clock signal is also relatively low, and the lower the frequency of voltage flipping, the lower the power consumption. Therefore, in the embodiments of the present application, with regard to the second display area with a relatively low effective data refresh frequency, the corresponding pulse change frequency of the second trigger signal and/or the second clock signal received by the second drive circuit is relatively low, which is beneficial to reduce power consumption. However, with regard to the first display area with a relatively high effective data refresh frequency, the corresponding pulse change frequency of the first trigger signal and/or the first clock signal received by the first drive circuit is relatively high, which can ensure a display effect of the first display area.

It should be noted that in a certain display state, the effective data refresh frequency corresponding to the first display area 101 and the effective data refresh frequency corresponding to the second display area 102 may be different; in another display state, the effective data refresh frequency corresponding to the first display area 101 and the effective data refresh frequency corresponding to the second display area 102 may have other corresponding relationships, for example, the effective data refresh frequency corresponding to the first display area 101 may be equal to the effective data refresh frequency corresponding to the second display area 102.

The effective data refresh frequency is described below.

Herein, the effective data refresh frequency may be equal to a number of times the data signal Vdata is written into a gate of a drive transistor in the pixel circuit Pixel within 1 second.

As one example, as shown in FIGS. 2 and 3, the pixel circuit may include a drive transistor M3, a reset transistor M5, a data write transistor M2, a compensation transistor M4, an initialization transistor M7, and a light-emitting control transistor M1/M6. The reset transistor M5 is configured for selectively providing a reset signal Vref1 for a gate of the drive transistor M3. As shown in FIG. 2, the reset transistor M5 may be connected to a control terminal of the drive transistor M3. The initialization transistor M7 is configured for selectively providing an initialization signal Vref2 to the light-emitting element D.

The light-emitting control transistor is configured for selectively allowing the light-emitting element D to enter a light-emitting stage. The light-emitting control transistor includes a first light-emitting control transistor M1 connected between the first power supply signal terminal PVDD and a source of the drive transistor M3, and a second light-emitting control transistor M6 connected between a drain of the drive transistor M3 (node N3 illustrated in the figure) and the light-emitting element D (node N4 illustrated in the figure). A first electrode of the compensation transistor M4 is connected to the output terminal N3 of the drive transistor M3, a second electrode of the compensation transistor M4 is connected to the control terminal N1 of the drive transistor M3, and the compensation transistor M4 is configured for compensating a threshold voltage deviation of the drive transistor M3.

The data write transistor M2 is configured for providing a data signal to the drive transistor M3, and as shown in FIG. 2, the data write transistor M2 is connected to an input terminal of the drive transistor M3 (node N2 illustrated in the figure). A first terminal of the storage capacitor Cst is connected to the first power supply signal terminal PVDD, and a second terminal of the storage capacitor Cst is connected to the gate of the drive transistor M3.

Optionally, the reset signal Vref1 and the initialization signal Vref2 may be the same or different. The reset signal Vref1 may also differ in different time periods of the same display panel and/or a voltage value of the initialization signal Vref2 may also differ in different time periods of the same display panel.

As shown in FIGS. 2 and 3, the scanning signal S2 may control whether the data signal Vdata can be written to the gate of the drive transistor M3, and when the scanning signal S2 is an active level, the data signal Vdata may be written to the gate of the drive transistor M3 (the gate of the drive transistor M3 is connected to the node N1). Herein, the effective data refresh frequency may be equal to the pulse change frequency of the scanning signal S2.

It should be noted that, for a PMOS transistor, the active level of the scanning signal is a low level signal, and under a condition that the transistor is a NMOS transistor, the active level of the scanning signal is a high level signal.

Figure 8:
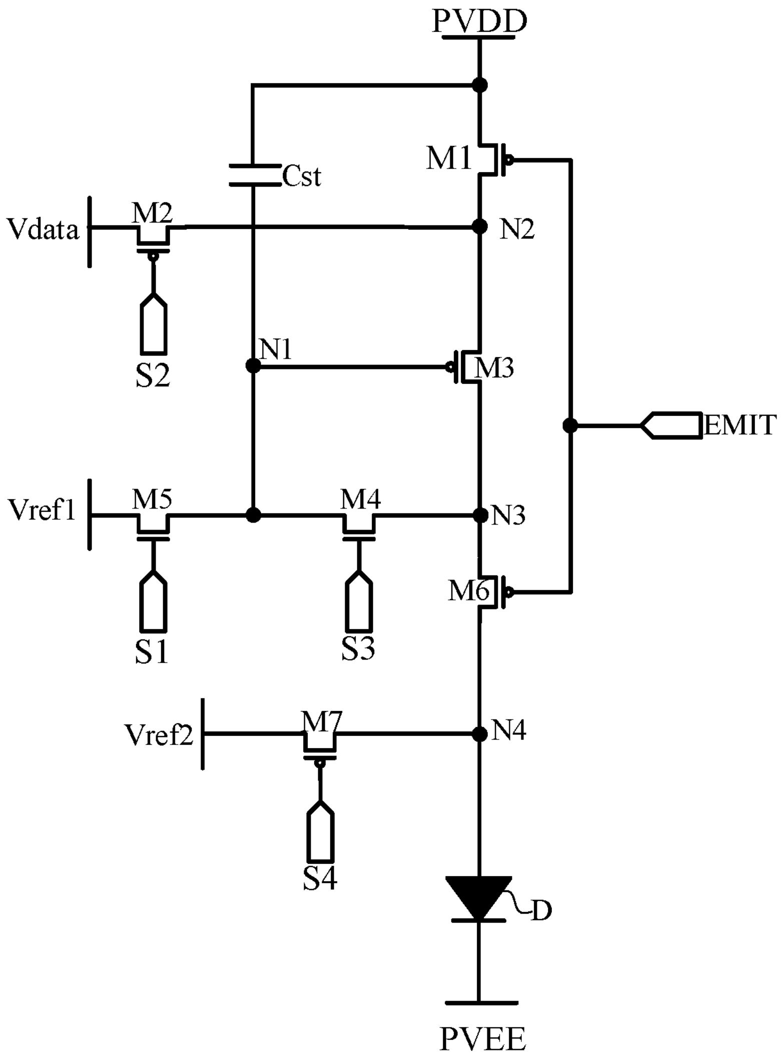
FIG. 8 illustrates a schematic diagram of another structure of a pixel circuit in a display panel according to an embodiment of the present application.

As another example, the structure of the pixel circuit may be as shown in FIG. 8. It should be noted that, in the drawings of the pixel circuit of the present application, the same reference numerals are used for the same positions of the transistors, which will not be described in detail herein.

As shown in FIG. 8, the compensation transistor M4 and the reset transistor M5 are oxide transistors.

A control terminal of the reset transistor M5 receives a first scanning signal S1, a control terminal of the data write transistor M2 receives a second scanning signal S2, a control terminal of the compensation transistor M4 receives a third scanning signal S3, and a control terminal of the initialization transistor M7 receives a fourth scanning signal S3.

Figure 9:
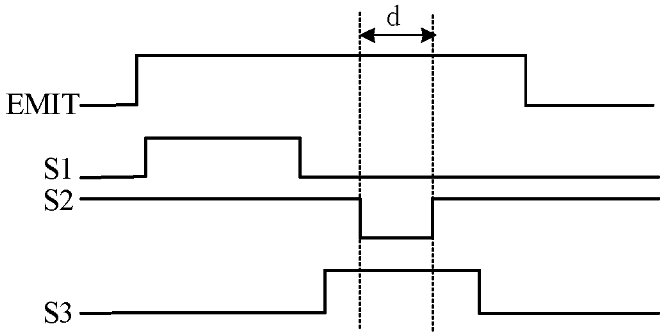
FIG. 9 illustrates a timing schematic diagram of FIG. 8.

As shown in FIGS. 8 and 9, the second scanning signal S2 and the third scanning signal S3 are simultaneously input with an active level, the data write transistor M2 and the compensation transistor M4 are turned on, the data signal Vdata is written to the gate of the drive transistor M3, and a time period during which active levels of the second scanning signal S2 and the third scanning signal S3 overlap is an effective data writing phase d. Herein, the effective data refresh frequency may be equal to a pulse change frequency of the time period during which active levels of the second scanning signal S2 and the third scanning signal S3 overlap, and it may also be understood that the effective data refresh frequency may be equal to a pulse change frequency of the second scanning signal S2.

Figure 10:
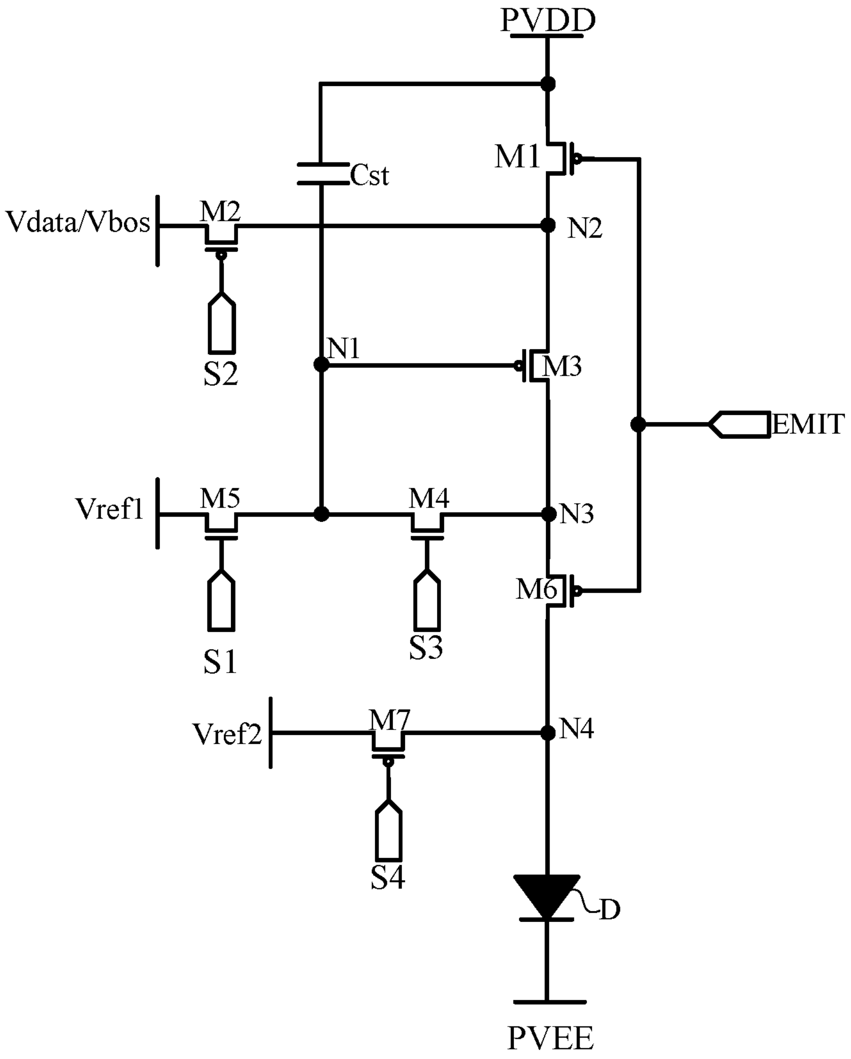
FIG. 10 illustrates a schematic diagram of yet another structure of a pixel circuit in a display panel according to an embodiment of the present application.
Figure 11:
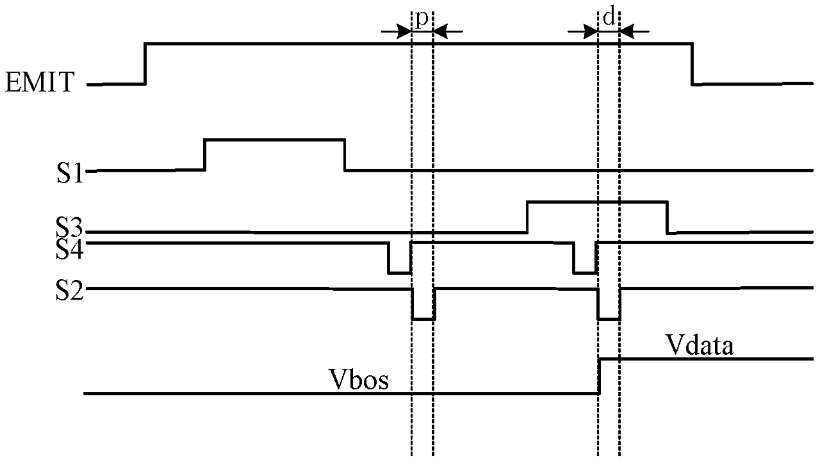
FIG. 11 illustrates a timing schematic diagram of FIG. 10.

As another example, to optimize the structure of the pixel circuit, the structure of the pixel circuit may be as shown in FIG. 10, and FIG. 11 illustrates a timing schematic diagram of FIG. 10.

As shown in FIGS. 10 and 11, an operation process of the pixel circuit includes a bias phase p during which the data write transistor M2 is arranged to provide a bias signal Vobs, and an effective data writing phase d during which the data write transistor M2 is arranged to provide the data signal Vdata.

In the bias phase p, the second scanning signal S2 is a low level signal, the data write transistor M2 is turned on, the drive transistor M3 is turned on, and the bias signal Vobs is written to the drain of the drive transistor M3 for adjusting a bias state of the drive transistor M3.

A voltage value of the bias signal Vobs may be greater than or equal to a voltage value of the data signal Vdata, or the voltage value of the bias signal Vobs may be less than the voltage value of the data signal Vdata.

The operation process of the pixel circuit includes a data writing frame and a holding frame, the data writing frame includes the bias phase, and/or the holding frame includes the bias phase.

As shown in FIGS. 10 and 11, in the effective data writing phase d, the second scanning signal S2 is a low level signal, the data transistor M2 is turned on, the third scanning signal S3 is a high level signal, the compensation transistor M4 is turned on, and the data signal Vdata is written to the gate of the drive transistor M3. A time period during which active levels of the second scanning signal S2 and the third scanning signal S3 overlap is the effective data writing phase d. Herein, the effective data refresh frequency may be equal to a pulse change frequency of the time period during which active levels of the second scanning signal S2 and the third scanning signal S3 overlap.

Figure 12:
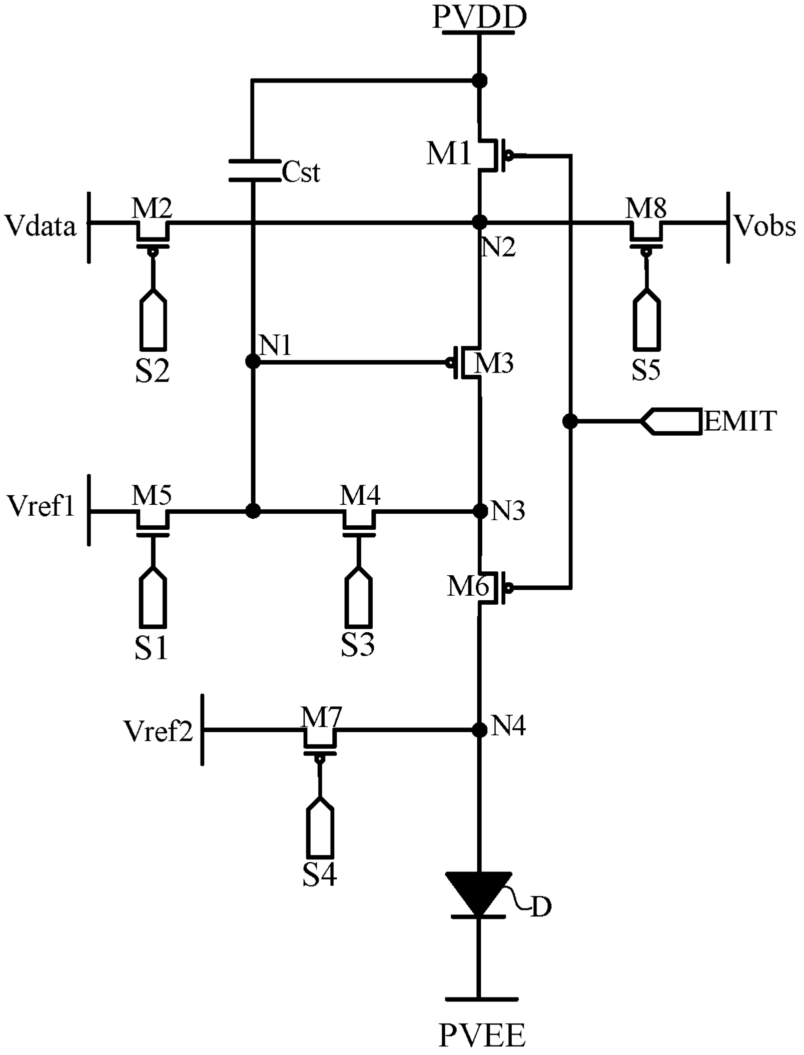
FIG. 12 illustrates a schematic diagram of yet another structure of a pixel circuit in a display panel according to an embodiment of the present application.
Figure 13:
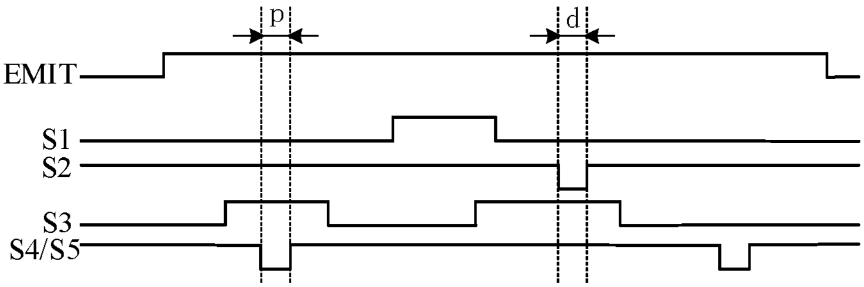
FIG. 13 illustrates a timing schematic diagram of FIG. 12.

As yet another example, the structure of the pixel circuit may be as shown in FIG. 12, and FIG. 13 illustrates a timing schematic diagram of FIG. 12.

As shown in FIGS. 12 and 13, compared to the pixel circuit shown in FIG. 8, in this embodiment, the pixel circuit provided by FIG. 12 further includes a bias transistor M8 for adjusting the bias state of the drive transistor M3, a first electrode of the bias transistor M8 receives a bias signal Vobs, and a second electrode of the bias transistor M8 is connected to an input terminal N2 of the drive transistor M3.

An operation process of the pixel circuit may include a bias phase p during which the bias transistor M8 is arranged to provide the bias signal Vobs, and an effective data writing phase d during which the data write transistor M2 is arranged to provide the data signal Vdata. In the bias phase p, a fifth scanning signal S5 is a low level signal, the bias transistor M8 is turned on, the drive transistor M3 is turned on, and the bias signal Vobs is written into the drain of the drive transistor M3 for adjusting the bias state of the drive transistor M3.

A voltage value of the bias signal Vobs may be greater than or equal to a voltage value of the data signal Vdata, or the voltage value of the bias signal Vobs may be less than the voltage value of the data signal Vdata.

The operation process of the pixel circuit includes a data writing frame and a holding frame, the data writing frame includes the bias phase, and/or the holding frame includes the bias phase.

Optionally, the fifth scanning signal S5 and the fourth scanning signal S4 may be the same scanning signal.

As shown in FIGS. 12 and 13, in the effective data writing stage d, the second scanning signal S2 is a low level signal, the data transistor M2 is turned on, the third scanning signal S3 is a high level signal, the compensation transistor M4 is turned on, and the data signal Vdata is written to the gate of the drive transistor M3. A time period during which active levels of the second scanning signal S2 and the third scanning signal S3 overlap is the effective data writing phase d. Herein, the effective data refresh frequency may be equal to a pulse change frequency of the time period during which active levels of the second scanning signal S2 and the third scanning signal S3 overlap.

Figure 14:
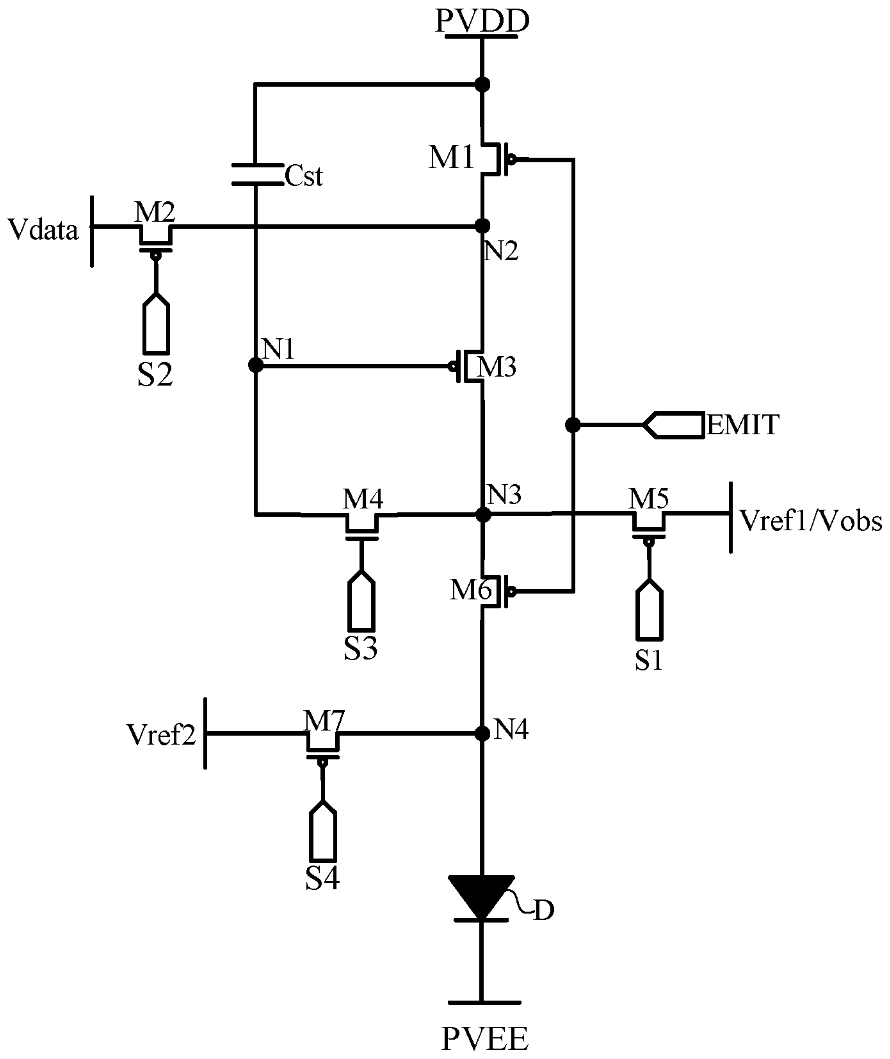
FIG. 14 illustrates a schematic diagram of yet another structure of a pixel circuit in a display panel according to an embodiment of the present application.
Figure 15:
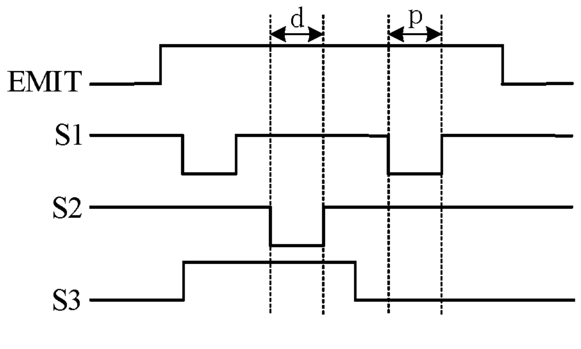
FIG. 15 illustrates a timing schematic diagram of FIG. 14.

As yet another example, the structure of the pixel circuit may be as shown in FIG. 14, and FIG. 15 illustrates a timing schematic diagram of FIG. 14.

As shown in FIGS. 14 and 15, the reset transistor M5 is configured to selectively provide the reset signal Vref1 to the gate of the drive transistor M3. As shown in FIG. 14, the reset transistor M5 is connected to the output terminal N3 of the drive transistor M3.

As shown in FIGS. 14 and 15, an operation process of the pixel circuit includes a reset phase c, a bias phase p and an effective data writing phase d. In the effective data writing phase d, the data write transistor M2 is arranged to provide the data signal Vdata, in the reset phase c, the reset transistor M5 is arranged to provide the reset signal Vref1, and in the bias phase p, the reset transistor M5 is arranged to provide the bias signal Vobs. In the bias phase p, the first scanning signal S1 is a low level signal, the reset transistor M5 is turned on, and the bias signal Vobs is written into the drain of the drive transistor M3 for adjusting the bias state of the drive transistor M3.

A voltage value of the bias signal Vobs may be greater than or equal to a voltage value of the reset signal Vref1, or the voltage value of the bias signal Vobs may be less than the voltage value of the reset signal Vref1.

Optionally, the first scanning signal S2 and the fifth scanning signal S5 may be the same scanning signal.

The operation process of the pixel circuit includes a data writing frame and a holding frame, the data writing frame includes the bias phase, and/or the holding frame includes the bias phase.

As shown in FIGS. 14 and 15, in the effective data writing stage d, the second scanning signal S2 is a low level signal, the data transistor M2 is turned on, the third scanning signal S3 is a high level signal, the compensation transistor M4 is turned on, and the data signal Vdata is written to the gate of the drive transistor M3. A time period during which active levels of the second scanning signal S2 and the third scanning signal S3 overlap is the effective data writing phase d. Herein, the effective data refresh frequency may be equal to a pulse change frequency of the time period during which active levels of the second scanning signal S2 and the third scanning signal S3 overlap.

In some embodiments, in the case where the effective data refresh frequency of the pixel circuits of the first display area 101 is K1 times the effective data refresh frequency of the pixel circuits of the second display area 102, the pulse change frequency of the first trigger signal STV1 may be K1 times the pulse change frequency of the second trigger signal STV2, and k1>1. Herein, by keeping a multiple relationship between the pulse change frequencies of the two trigger signals in synchronization with a multiple relationship between the effective data refresh frequencies of the two display areas, disorder of signals output by the first drive circuit and the second drive circuit can be avoided, thereby avoiding a poor display phenomenon such as a splash screen.

For example, the effective data refresh frequency of the pixel circuits of the first display area 101 is 120 HZ and the effective data refresh frequency of the pixel circuits of the second display area 102 is 60 HZ, then K1=2. Illustratively, the pulse change frequency of the first trigger signal STV1 may be equal to the effective data refresh frequency of the pixel circuits of the first display area 101. The pulse change frequency of the second trigger signal STV2 may be equal to the effective data refresh frequency of the pixel circuits of the second display area 102.

In further embodiments, in the case where the effective data refresh frequency of the pixel circuits of the first display area 101 is K2 times the effective data refresh frequency of the pixel circuits of the second display area 102, K2>1, the pulse change frequency of the first trigger signal STV1 may be K2 times the pulse change frequency of the second trigger signal STV2, and the pulse change frequency of the first clock signal may be K2 times the pulse change frequency of the second clock signal. Herein, by keeping both a multiple relationship between the pulse change frequencies of the two trigger signals and a multiple relationship between the pulse change frequencies of the two clock signals in synchronization with a multiple relationship between the effective data refresh frequencies of the two display areas, disorder of signals output by the first drive circuit and the second drive circuit can be further avoided, thereby further avoiding a poor display phenomena such as a splash screen.

The pulse change frequency of the first clock signal being K2 times the pulse change frequency of the second clock signal may specifically include: the pulse change frequency of the first sub-clock signal CK1 is K2 times the pulse change frequency of the third sub-clock signal CK2, and the pulse change frequency of the second sub-clock signal XCK1 is K2 times the pulse change frequency of the fourth sub-clock signal XCK2.

In some embodiments, effective pulse time lengths of the two trigger signals may be held constant, and duty cycles of the two trigger signals may be varied to achieve different pulse change frequencies of the two trigger signals. Herein, a duty cycle may be a ratio of an effective pulse time length to an ineffective pulse time length.

Figure 16:
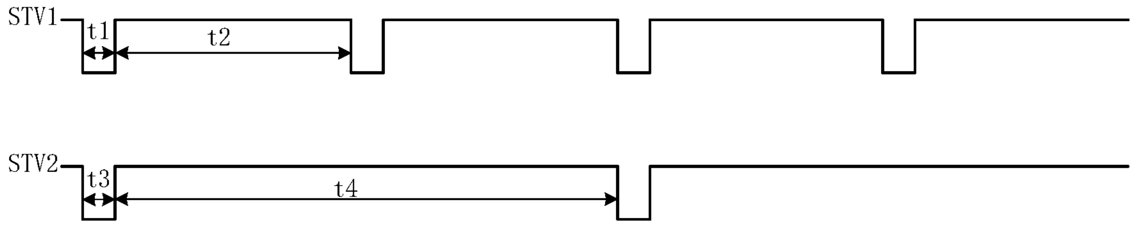
FIG. 16 illustrates another schematic diagram of control signals in a display panel according to an embodiment of the present application.

Specifically, in the case where the pulse change frequency of the first trigger signal STV1 is greater than the pulse change frequency of the second trigger signal STV2, as shown in FIG. 16, an effective pulse time length of the first trigger signal STV1 is t1, an ineffective pulse time length of the first trigger signal STV1 is t2, an effective pulse time length of the second trigger signal STV2 is t3, and an ineffective pulse time length of the second trigger signal STV2 is t4, $$t1 = t3,$$

$$\frac{t1}{t2} > \frac{t3}{t4}.$$

Illustratively, t1<t2 and t3<t4.

As described above, the first drive signal output by the first drive circuit may control transistors in the pixel circuits to be turned on or off, and various stages of the first shift registers of the first drive circuit may shift to output an effective pulse of the first trigger signal, so that the effective pulse of the first trigger signal may be understood as being able to control the transistors to be turned on, and an ineffective pulse of the first trigger signal may be understood as being able to control the transistors to be turned off. Similarly, an effective pulse of the second trigger signal may be understood as being able to control the transistors to be turned on, and an ineffective pulse of the second trigger signal may be understood as being able to control the transistors to be turned off. The drawings herein exemplarily illustrate that the effective pulse of the two trigger signals is a low level and the ineffective pulse is a high level, and this is not intended to limit the present application.

In the embodiments of the present application, since the effective pulse time lengths of the two trigger signals are equal, turn-on time periods of the transistors of the pixel circuits respectively controlled by the first drive circuit and the second drive circuit are equal, that is to say, charging time periods of the pixel circuits in the two display areas can be equal, which is beneficial to improve a consistency of charging effects.

In the case where t1=t3 and $$\frac{t1}{t2} > \frac{t3}{t4},$$

furthermore, t4 and t1, t2 may satisfy the following relationship:

$$t4 = n*t2 + (n-1)*t1, n \geq 2, \text{ and } n \text{ is an integer}$$

In this way, it is ensured that t4 is sufficiently large to ensure that the pulse change frequency of the second trigger signal STV2 is smaller than the pulse change frequency of the first trigger signal STV1.

In other embodiments, the duty cycles of the two trigger signals may be held constant, and the effective pulse time lengths of the two trigger signals may be varied to achieve different pulse change frequencies of the two trigger signals.

Figure 17:
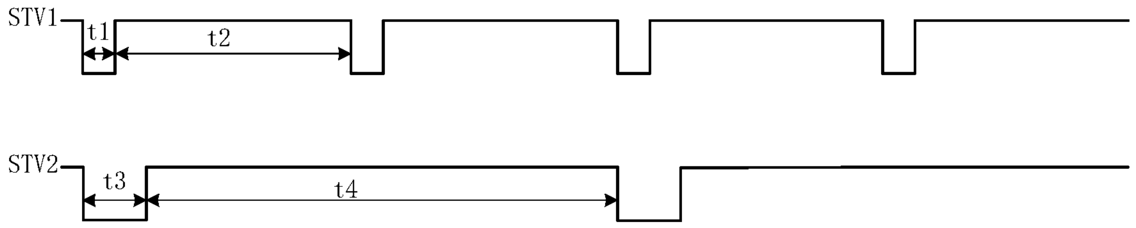
FIG. 17 illustrates yet another schematic diagram of control signals in a display panel according to an embodiment of the present application.

Specifically, in the case where the pulse change frequency of the first trigger signal STV1 is greater than the pulse change frequency of the second trigger signal STV2, as shown in FIG. 17, the effective pulse time length of the first trigger signal STV1 is t1, the ineffective pulse time length of the first trigger signal STV1 is t2, the effective pulse time length of the second trigger signal STV2 is t3, the ineffective pulse time length of the second trigger signal STV2 is t4, t1<t3, and $$\frac{t1}{t2} = \frac{t3}{t4}.$$

It will be appreciated that t2<t4.

In the embodiments of the present application, since the duty cycles of the two trigger signals are equal, it is equivalent to lengthening the effective pulse time length and the ineffective pulse time length of the first trigger signal STV1 by an equal multiple, and then the second trigger signal STV2 may be obtained, or it is equivalent to shortening the effective pulse time length and the ineffective pulse time length of the second trigger signal STV2 by an equal multiple, and then the first trigger signal STV1 may be obtained, and thus the first trigger signal STV1 and the second trigger signal STV2 can be conveniently formed.

For example, the effective data refresh frequency of the pixel circuits of the first display area 101 is K1 times the effective data refresh frequency of the pixel circuits of the second display area 102, in the case where t1<t3 and $$\frac{t1}{t2} = \frac{t3}{t4},$$

furthermore, $$\frac{t3}{t1} = K1,$$

$$\frac{t4}{t2} = Kl,$$

$$kl > 1.$$

It can be understood that this is equivalent to lengthening both the effective pulse time length and the ineffective pulse time length of the first trigger signal STV1 by K1 times so as to obtain the second trigger signal STV2, so that disorder of signals output by the first drive circuit and the second drive circuit can be further avoided, thereby further avoiding a poor display phenomena such as a splash screen.

Figure 18:
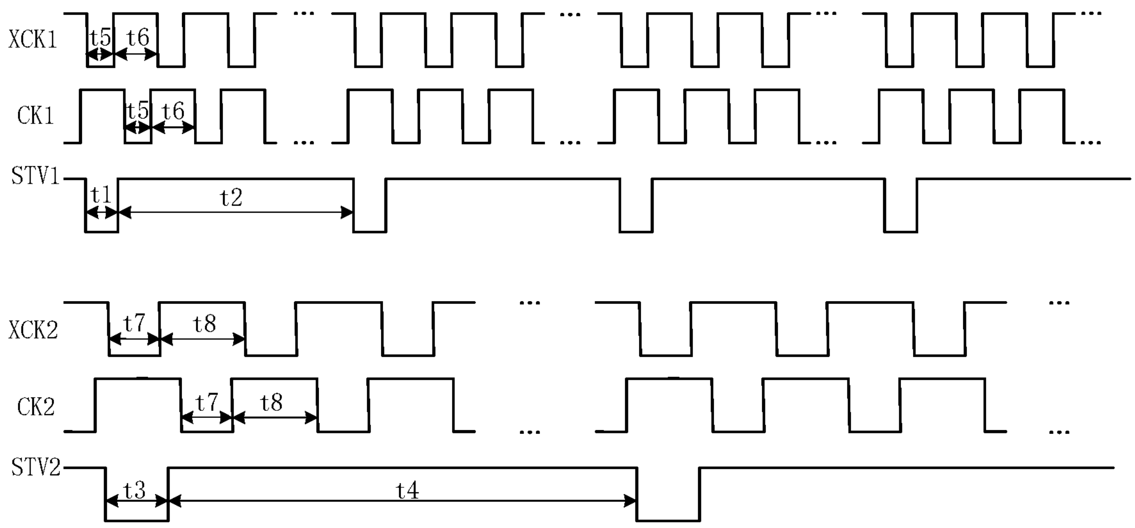
FIG. 18 illustrates yet another schematic diagram of control signals in a display panel according to an embodiment of the present application.

In some embodiments, in the case where the pulse change frequency of the first trigger signal STV1 is K2 times of the pulse change frequency of the second trigger signal STV2, and the pulse change frequency of the first clock signal is K2 times of the pulse change frequency of the second clock signal, as shown in FIG. 18, the effective pulse time length of the first trigger signal STV1 is t1, the ineffective pulse time length of the first trigger signal STV1 is t2, the effective pulse time length of the second trigger signal STV2 is t3, and the ineffective pulse time length of the second trigger signal STV2 is t4, $$\frac{t3}{t1} = K2,$$

$$\frac{t4}{t2} = K2.$$

The effective pulse time length of the first clock signal is t5, the ineffective pulse time length of the first clock signal is t6, the effective pulse time length of the second clock signal is t7, the ineffective pulse time length of the second clock signal is t8, $$\frac{t7}{t5} = K2,$$

$$\frac{t8}{t6} = K2.$$

It can be understood that this is equivalent to lengthening both the effective pulse time length and the ineffective pulse time length of the first trigger signal STV1 by K2 times so as to obtain the second trigger signal STV2, and is equivalent to lengthening both the effective pulse time length and the ineffective pulse time length of the first clock signal by K2 times so as to obtain the second clock signal, so that disorder of signals output by the first drive circuit and the second drive circuit can be further avoided, thereby further avoiding a poor display phenomenon such as a splash screen.

A level of an effective pulse of the first clock signal may be the same as a level of the effective pulse of the first trigger signal, and a level of an ineffective pulse of the first clock signal may be the same as a level of the ineffective pulse of the first trigger signal. A level of an effective pulse of the second clock signal may be the same as a level of the effective pulse of the second trigger signal, and a level of an ineffective pulse of the second clock signal may be the same as a level of the ineffective pulse of the second trigger signal. For example, effective pulses of the first clock signal and the second clock signal are both at a low level and ineffective pulses of the first clock signal and the second clock signal are both at a high level.

As shown in FIG. 18, the effective pulse time lengths of the first sub-clock signal CK1 and the second sub-clock signal XCK1 included in the first clock signal are both t5, and the ineffective pulse time lengths of the first sub-clock signal CK1 and the second sub-clock signal XCK1 are both t6. The effective pulse time lengths of the third sub-clock signal CK2 and the fourth sub-clock signal XCK2 included in the second clock signal are both t7, and the ineffective pulse time lengths of the third sub-clock signal CK2 and the fourth sub-clock signal XCK2 are both t8.

For a single clock signal, the pulse change frequency may be different in different phases. In some embodiments, an operation process of the pixel circuit in the display panel may include a data writing frame and a holding frame. In the data writing frame, a data signal is written to the gate of the drive transistor of the pixel circuit. In the holding frame, the data signal is no longer written to the gate of the drive transistor of the pixel circuit, and the gate of the drive transistor holds the data signal written in the data writing frame.

The first clock signal may have a different pulse change frequency in the data writing frame than in the holding frame. In additional/alternatively, the second clock signal may have a different pulse change frequency in the data writing frame than in the holding frame.

In the embodiments of the present application, since writing requirements of the data signal for the data writing frame and the holding frame are different, the pulse change frequencies of the first clock signal and/or the second clock signal in the data writing frame and in the holding frame are set to be different, which can flexibly apply to different requirements of the data writing frame and the holding frame.

Specifically, the first clock signal includes a first sub-clock signal CK1 and a second sub-clock signal XCK1, wherein the first sub-clock signal CK1 may have a different pulse change frequency in the data writing frame than in the holding frame, and the second sub-clock signal XCK1 may have a different pulse change frequency in the data writing frame than in the holding frame. The first sub-clock signal CK1 and the second sub-clock signal XCK1 may have the same pulse change frequency in the data writing frame, and the first sub-clock signal CK1 and the second sub-clock signal XCK1 may have the same pulse change frequency in the holding frame.

The second clock signal includes the third sub-clock signal CK2 and the fourth sub-clock signal XCK2, wherein the pulse change frequency of the third sub-clock signal CK2 in the data writing frame may be different from its pulse change frequency in the holding frame, and the pulse change frequency of the fourth sub-clock signal XCK2 in the data writing frame may be different from its pulse change frequency in the holding frame. The third sub-clock signal CK2 and the fourth sub-clock signal XCK2 may have the same pulse change frequency in the data writing frame as that in the holding frame, and the third sub-clock signal CK2 and the fourth sub-clock signal XCK2 may have the same pulse change frequency in the data writing frame as that in the holding frame.

As an example, the pulse change frequency of the first clock signal in the data writing frame is greater than its pulse change frequency in the holding frame; and/or the pulse change frequency of the second clock signal in the data writing frame is greater than its pulse change frequency in the holding frame.

In the embodiments of the present application, since the data signal does not need to be written in the holding frame, the pulse change frequency of the first clock signal and/or the second clock signal in the holding frame can be relatively small, thereby further reducing power consumption while avoiding affecting data writing.

Figure 19:
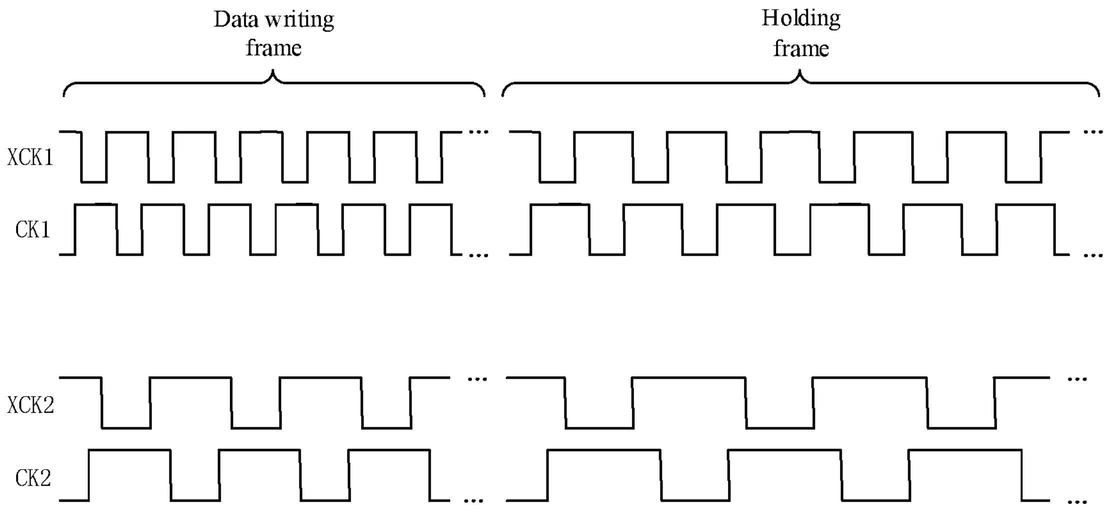
FIG. 19 illustrates yet another schematic diagram of control signals in a display panel according to an embodiment of the present application.

Specifically, as shown in FIG. 19, the first clock signal includes a first sub-clock signal CK1 and a second sub-clock signal XCK1, wherein the pulse change frequency of the first sub-clock signal CK1 in the data writing frame is greater than the pulse change frequency of the first sub-clock signal CK1 in the holding frame, and the pulse change frequency of the second sub-clock signal XCK1 in the data writing frame is greater than the pulse change frequency of the second sub-clock signal XCK1 in the holding frame. The first sub-clock signal CK1 and the second sub-clock signal XCK1 may have the same pulse change frequency in the data writing frame, and the first sub-clock signal CK1 and the second sub-clock signal XCK1 may have the same pulse change frequency in the holding frame.

The second clock signal includes a third sub-clock signal CK2 and a fourth sub-clock signal XCK2, wherein the pulse change frequency of the third sub-clock signal CK2 in the data writing frame is greater than the pulse change frequency of the third sub-clock signal CK2 in the holding frame, and the pulse change frequency of the fourth sub-clock signal XCK2 in the data writing frame is greater than the pulse change frequency of the fourth sub-clock signal XCK2 in the holding frame. The third sub-clock signal CK2 and the fourth sub-clock signal XCK2 may have the same pulse change frequency in the data writing frame as that in the holding frame, and the third sub-clock signal CK2 and the fourth sub-clock signal XCK2 may have the same pulse change frequency in the data writing frame as that in the holding frame.

Figure 20:
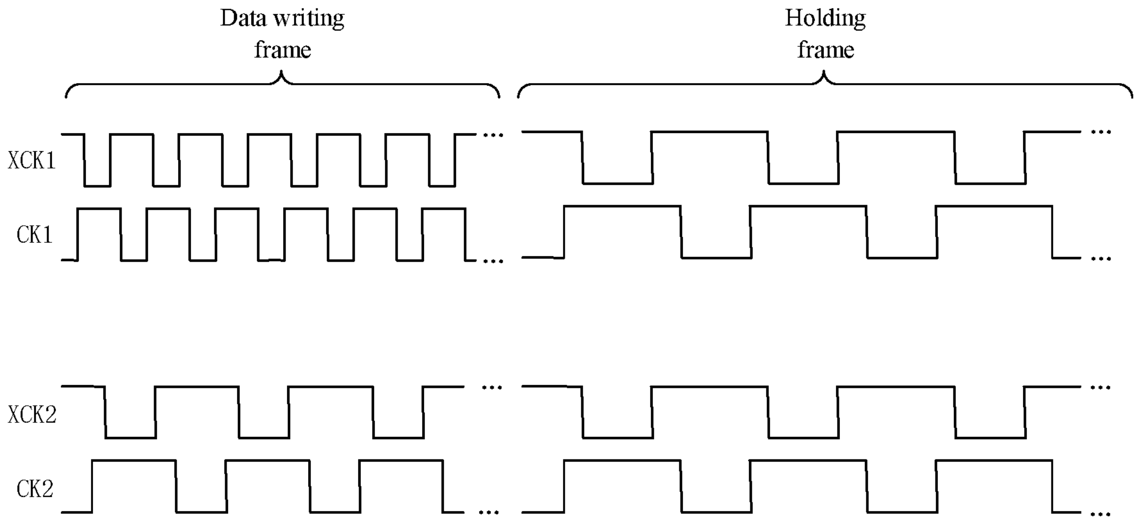
FIG. 20 illustrates yet another schematic diagram of control signals in a display panel according to an embodiment of the present application.

For different first and second clock signals, the pulse change frequencies of the two signals may be different, which may mean that the pulse change frequencies of the two signals are different in the data writing frame. For example, as shown in FIG. 20, in the data writing frame, the pulse change frequency of the first clock signal and the pulse change frequency of the second clock signal are different; in the holding frame, the pulse change frequency of the first clock signal and the pulse change frequency of the second clock signal may be the same.

In particular, the first clock signal includes a first sub-clock signal CK1 and a second sub-clock signal XCK1, and the second clock signal includes a third sub-clock signal CK2 and a fourth sub-clock signal XCK2. In the data writing frame, the pulse change frequency of the first sub-clock signal CK1 and the pulse change frequency of the third sub-clock signal CK2 are different, and the pulse change frequency of the second sub-clock signal XCK1 and the pulse change frequency of the fourth sub-clock signal XCK2 are different. In the holding frame, the pulse change frequency of the first sub-clock signal CK1 is the same as the pulse change frequency of the third sub-clock signal CK2, and the pulse change frequency of the second sub-clock signal XCK1 is the same as the pulse change frequency of the fourth sub-clock signal XCK2.

Figure 21:
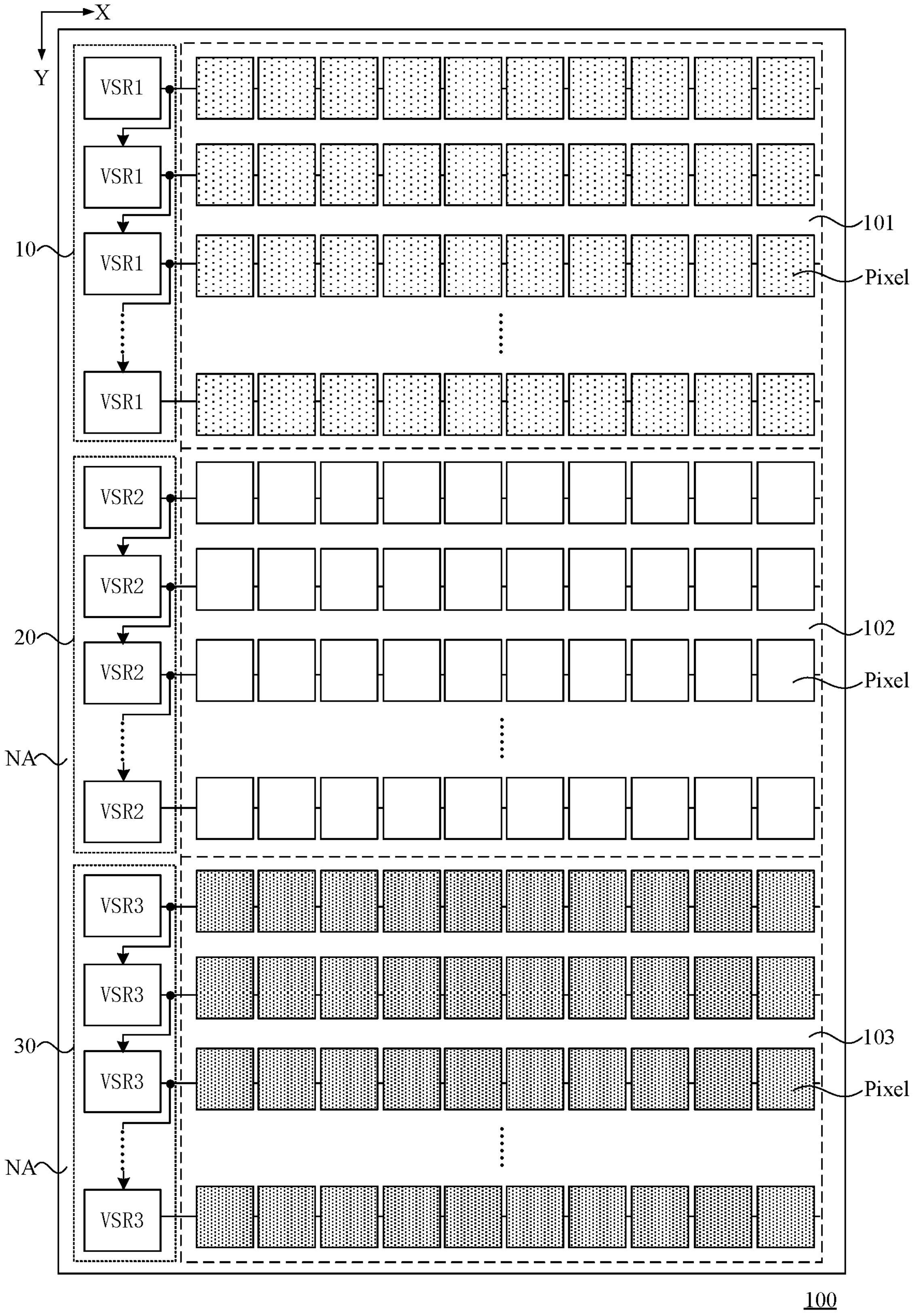
FIG. 21 illustrates a schematic diagram of another structure of a display panel according to an embodiment of the present application.

In some embodiments, as shown in FIG. 21, the display panel 100 may further include a third display area 103 and a third drive circuit 30. Pixel circuits Pixel are distributed in the third display area 103. In order to better distinguish areas to which the pixel circuits Pixel belong, different fill colors are used in FIG. 21 to represent the pixel circuits Pixel within the first display area 101, the second display area 102 and the third display area 103.

The third drive circuit 30 may include multi-stage third shift registers VSR3. The third drive circuit 30 is configured to receive a third control signal and to generate a third drive signal based on the third control signal. The third drive circuit 30 provides the generated third drive signal to the pixel circuits Pixel in the third display area 103, so that the transistors of the pixel circuits Pixel in the third display area 103 may be turned on or off under the control of the third drive signal.

As an example, the third drive circuit 30 may be a scanning drive circuit, such that a type of the third drive signal may be scanning signals Scan (n−1), scan (n) shown in FIG. 2, and the third drive circuit 30 provides the scanning signals Scan (n−1), scan (n) to the pixel circuits Pixel of the third display area 103.

As another example, the third drive circuit 30 may be a light-emitting drive circuit, so that the type of the third drive signal may be the light-emitting control signal Emit shown in FIG. 2, and the third drive circuit 30 provides the light-emitting control signal Emit to the pixel circuits Pixel of the third display area 103.

In the embodiments of the present application, the pulse change frequency of the first control signal, the pulse change frequency of the second control signal and the pulse change frequency of the third control signal are different.

Figure 22:
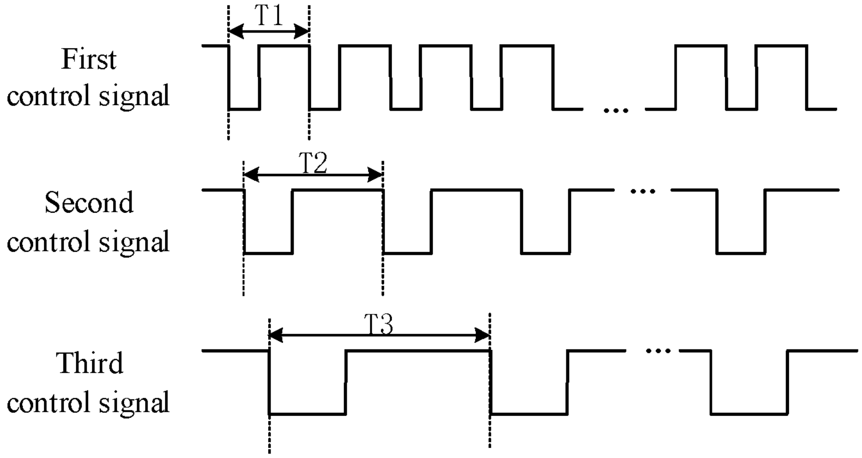
FIG. 22 illustrates yet another schematic diagram of control signals in a display panel according to an embodiment of the present application.

It will be appreciated that the third control signal is also a pulse signal. As shown in FIG. 22, the third control signal may also include alternating high levels and low levels. For example, a period of the third control signal is T3, and the pulse change frequency of the third control signal may be understood as a number of times the third control signal completes a periodic change within a unit time (for example, within 1 second), and the pulse change frequency of the third control signal may be equal to 1/T3.

For example, the first control signal may have a pulse change frequency of 120 HZ, the second control signal may have a pulse change frequency of 90 HZ, and the third control signal may have a pulse change frequency of 60 HZ. These numbers are, of course, merely exemplary and are not intended to limit the present application.

According to the embodiments of the present application, drive circuits are designed on an area basis with regard to different display areas. Specifically, pixel circuits of the first display area are driven by the first drive circuit, pixel circuits of the second display area are driven by the second drive circuit, and pixel circuits of the third display area are driven by the third drive circuit. The first drive circuit receives the first control signal, the second drive circuit receives the second control signal, and the third drive circuit receives the third control signal. Since the pulse change frequency of the first control signal, the pulse change frequency of the second control signal and the pulse change frequency of the third control signal are different, the first drive signal generated by the first drive circuit, the second drive signal generated by the second drive circuit and the third drive signal generated by the third drive circuit are also different, and thus different display requirements of the first display area, the second display area and the third display area can be flexibly realized.

Figure 23:
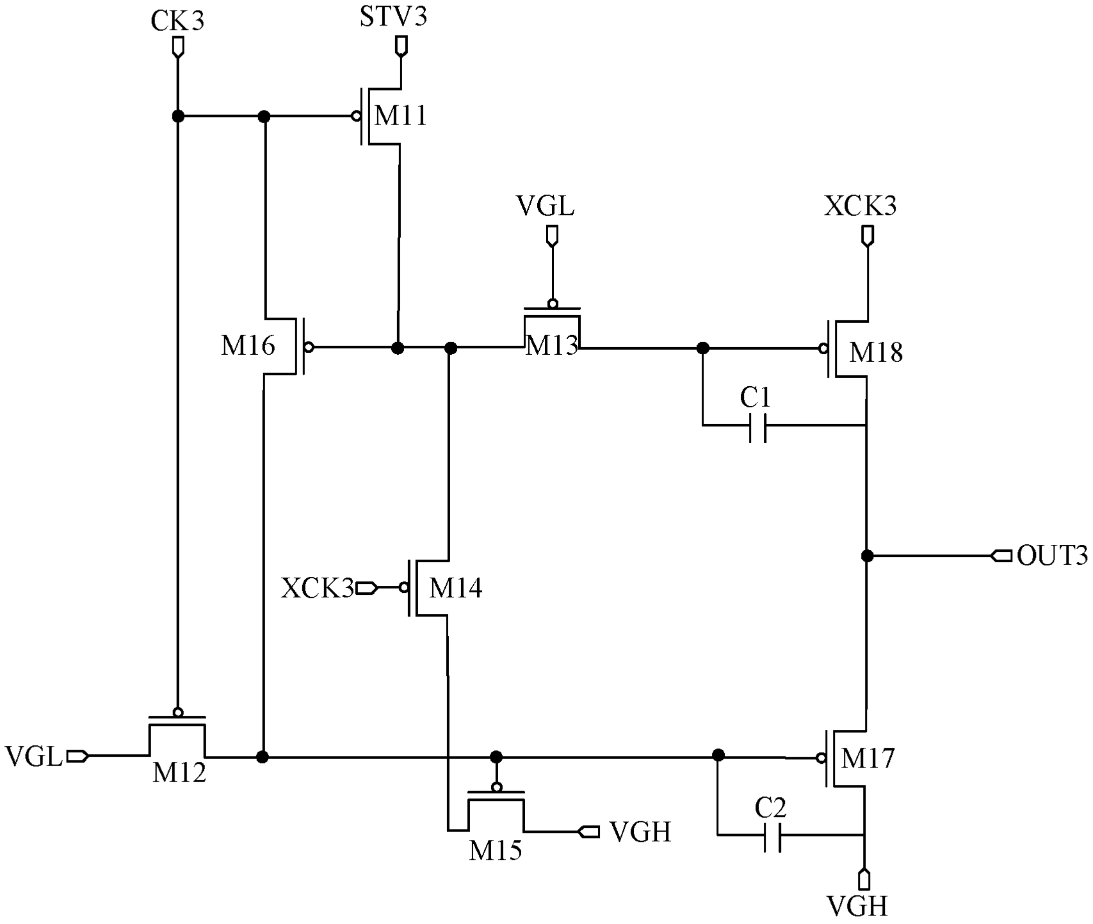
FIG. 23 illustrates a schematic diagram of a structure of a third shift register in a display panel according to an embodiment of the present application.

In some examples, a circuit structure of the third shift registers VSR3 may be the same as the circuit structure of the first shift registers VSR1, with the difference that, as shown in FIG. 23, the third control signal received by the third drive circuit 30 may include a third trigger signal STV3 and a third clock signal, and description herein is given by taking an example where the third clock signal may include a fifth sub-clock signal CK3 and a sixth sub-clock signal XCK3. An operation process of the third shift registers VSR3 may be the same as the operation process of the first shift registers VSR1, and an output terminal OUT3 of each stage of the third shift registers VSR3 of the third drive circuit 30 may output the third drive signal under the control of the third trigger signal STV3 and the third clock signal.

It will be appreciated that a signal output at an output terminal of a previous stage of the third shift registers VSR3 may serve as the third trigger signal for a next stage of the third shift registers VSR3.

As an example, the pulse change frequency of the first trigger signal STV1, the pulse change frequency of the second trigger signal STV2 and the pulse change frequency of the third trigger signal STV3 may be different, and the pulse change frequency of the first clock signal, the pulse change frequency of the second clock signal and the pulse change frequency of the third clock signal may be different.

The pulse change frequency of the first clock signal, the pulse change frequency of the second clock signal and the pulse change frequency of the third clock signal are different, which may specifically include: the pulse change frequency of the first sub-clock signal CK1, the pulse change frequency of the third sub-clock signal CK2 and the pulse change frequency of the fifth sub-clock signal CK3 may be different, and the pulse change frequency of the second sub-clock signal XCK1, the pulse change frequency of the fourth sub-clock signal XCK2 and the pulse change frequency of the sixth sub-clock signal XCK3 may be different.

As another example, the pulse change frequency of the first trigger signal STV1, the pulse change frequency of the second trigger signal STV2, and the pulse change frequency of the third trigger signal STV3 may be different, and the pulse change frequency of the first clock signal and the pulse change frequency of the second clock signal are different, and the pulse change frequency of the third clock signal is the same as one of the pulse change frequency of the first clock signal and the pulse change frequency of the second clock signal. That is, the third display area shares a clock signal of one of the first display area and the second display area, so that a number of clock signal terminals can be reduced, which is advantageous for cost reduction.

In some embodiments, two display areas sharing a clock signal may be set based on the effective data refresh frequency for each of the three display areas.

For example, the first display area 101 includes pixel circuits Pixel from row M to row N, and an effective data refresh frequency of the pixel circuits Pixel from row M to row N is F1. The second display area 102 includes pixel circuits Pixel from row P to row Q, and an effective data refresh frequency of the pixel circuits Pixel from row P to row Q is F2. The third display area 103 includes pixel circuits Pixel from row R to row S, and an effective data refresh frequency of the pixel circuits Pixel from row R to row S is F3.

In the case where $|F3-F1|<|F3-F2|$, the pulse change frequency of the third clock signal may be the same as the pulse change frequency of the second clock signal. That is to say, the effective data refresh frequency corresponding to the third display area is closer to the effective data refresh frequency corresponding to the first display area, so that two display areas with relatively close effective data refresh frequencies can share a clock signal, thereby ensuring that the third display area has a relatively good display effect.

In the case where $F1>F2$, the pulse change frequency of the first clock signal is greater than the pulse change frequency of the second clock signal, and the pulse change frequency of the third clock signal is equal to the pulse change frequency of the second clock signal. That is to say, the third display area shares a lower pulse change frequency of the second clock signal corresponding to the second display area, so that power consumption can be further reduced.

The pulse change frequency of the third clock signal is the same as the pulse change frequency of the second clock signal, which may specifically include: the pulse change frequency of the fifth sub-clock signal CK3 is the same as the pulse change frequency of the third sub-clock signal CK2, and the pulse change frequency of the sixth sub-clock signal XCK3 is the same as the pulse change frequency of the fourth sub-clock signal XCK2.

Figure 24:
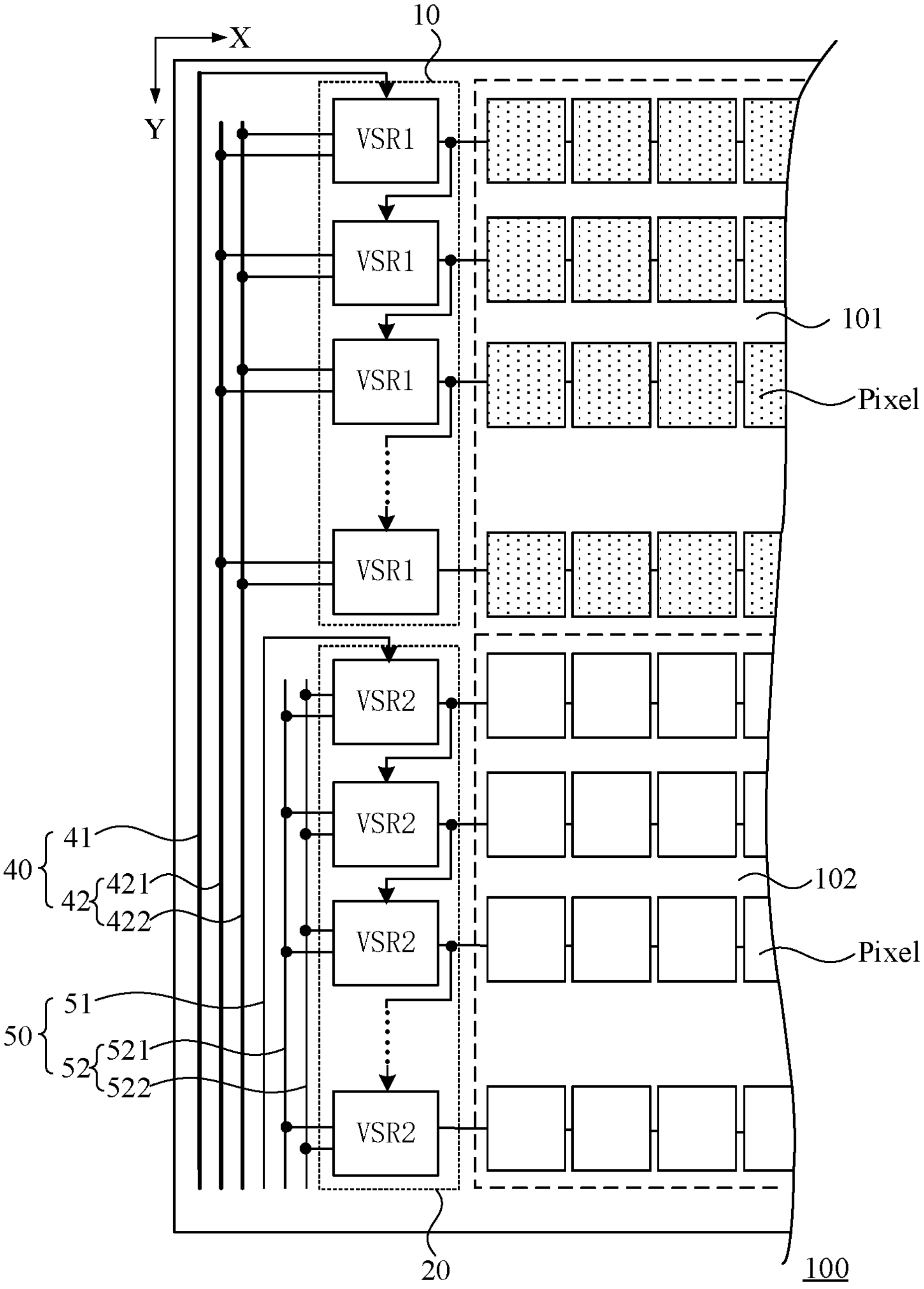
FIG. 24 illustrates a schematic diagram of yet another structure of a display panel according to an embodiment of the present application.

As introduced above, the pulse change frequency of the first trigger signal STV1 and the pulse change frequency of the second trigger signal STV2 may be different. As an example, different trigger signal lines may be provided for transmitting the first trigger signal STV1 and the second trigger signal STV2, respectively. Specifically, as shown in FIG. 24, the display panel 100 may further include a first trigger signal line 41 configured to provide the first trigger signal STV1 to a first stage of the first shift registers VSR1, and a second trigger signal line 51 configured to provide the second trigger signal STV2 to a first stage of the second shift registers VSR2.

In the embodiments of the present application, by providing two trigger signal lines, the first drive circuit 10 and the second drive circuit 20 can be independent from each other, and an operating stability of the first drive circuit 10 and the second drive circuit 20 can be improved; in addition, the first drive circuit 10 and the second drive circuit 20 can start to operate at the same time, such that within one frame, the first drive circuit 10 only needs to drive a plurality of rows of pixel circuits of the first display area and the second drive circuit 20 only needs to drive a plurality of rows of pixel circuits of the second display area, and thus compared to all the rows of pixel circuits of the display panel to be driven within one frame, a number of rows of pixel circuits driven by the first drive circuit 10 and the second drive circuit 20 within one frame is reduced, therefore a charging time period of the pixel circuits can be extended, which is advantageous for improving the charging effect and thus improving the display effect.

Figure 25:
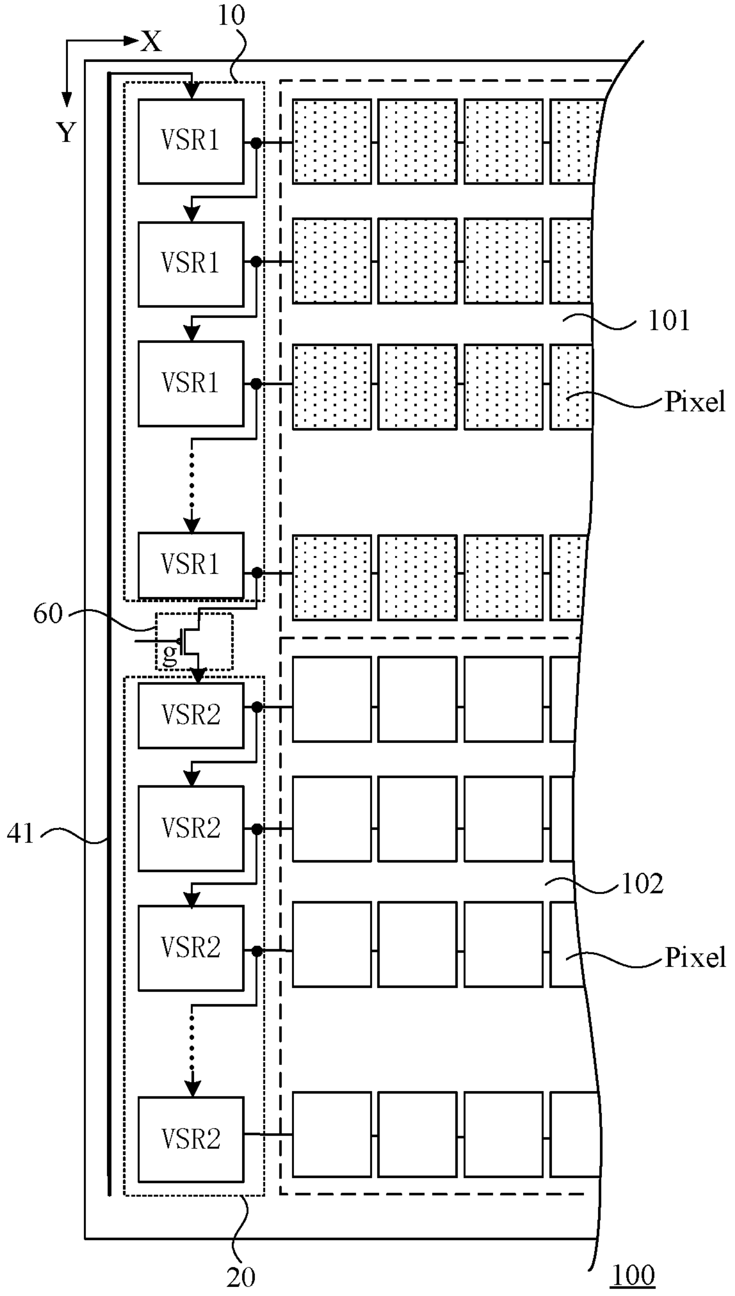
FIG. 25 illustrates a schematic diagram of yet another structure of a display panel according to an embodiment of the present application.
Figure 26:
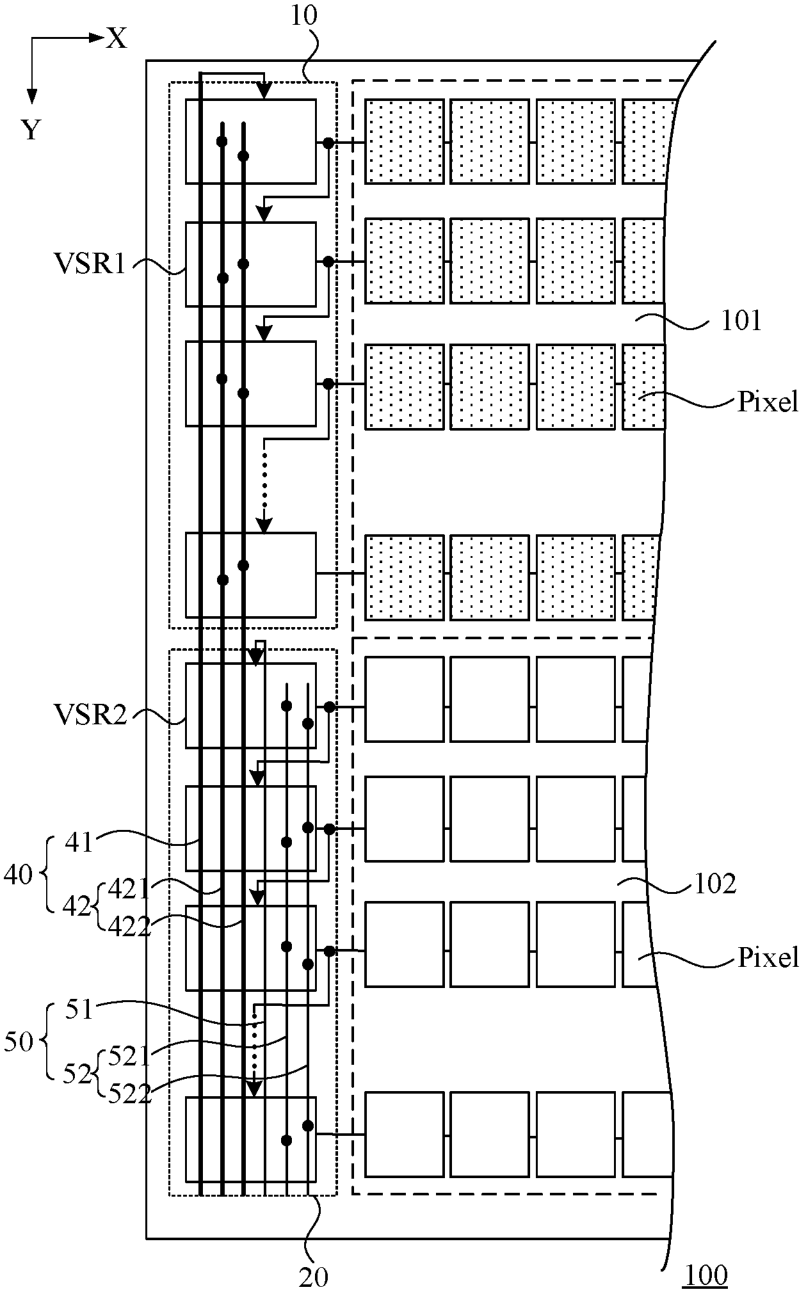
FIG. 26 illustrates a schematic diagram of yet another structure of a display panel according to an embodiment of the present application.

As another example, only one trigger signal line may be provided and a frequency conversion module is connected between the first shift registers VSR1 and the second shift registers VSR2. Specifically, as shown in FIG. 25, the display panel 100 may further include a first trigger signal line 41 and a frequency conversion module 60. The first trigger signal line 41 is configured to provide the first trigger signal STV1 to a first stage of the first shift registers VSR1. The frequency conversion module 60 is connected between the first shift registers VSR1 and the second shift registers VSR2, and the frequency conversion module 60 may be configured for generating a second trigger signal STV2 and providing the second trigger signal STV2 to a first stage of the second shift registers VSR2.

Specifically, the frequency conversion module 60 may be connected between an output terminal of a last stage of the first shift registers VSR1 and a trigger signal input terminal of the first stage of the second shift registers VSR2, and the frequency conversion module 60 may be configured for changing the pulse change frequency of the first drive signal output by the last stage of the first shift registers VSR1 to obtain the second trigger signal STV2, and providing the second trigger signal STV2 to the first stage of the second shift registers VSR2.

In the embodiments of the present application, by providing the frequency conversion module 60, a number of trigger signal lines can be reduced, which is advantageous for realizing a narrow border.

The embodiments of the present application describes the frequency conversion module by taking a trigger signal as an example, and it can be understood that the frequency conversion module is applicable not only to frequency conversion of a trigger signal, but also to frequency conversion of a clock signal, and the description thereof will not be repeated herein.

Illustratively, the frequency conversion module 60 may include a control terminal, an input terminal, and an output terminal. The input terminal of the frequency conversion module 60 is connected to an output terminal of the first shift registers VSR1, for example, the input terminal of the frequency conversion module 60 may be connected to the output terminal of the last stage of the first shift registers VSR1. The output terminal of the frequency conversion module 60 is connected to a trigger signal input terminal of the second shift registers VSR2, for example, the output terminal of the frequency conversion module 60 is connected to the trigger signal input terminal of the first stage of the second shift registers VSR2. The control terminal of the frequency conversion module 60 may receive a control signal, and the frequency conversion module 60 may be turned on or off under the control of the control signal.

The frequency conversion module 60 may include a transistor, wherein a gate g of the transistor serves as the control terminal of the frequency conversion module 60, a first electrode of the transistor serves as the input terminal of the frequency conversion module 60, and a second electrode of the transistor serves as the output terminal of the frequency conversion module 60. The first electrode of the transistor may be the source and the second electrode of the transistor may be the drain.

In some examples, different control signal lines may be provided to transmit the first control signal and the second control signal, respectively. With continued reference to FIG. 24, the display panel 100 may further include a first control signal line 40 and a second control signal line 50. The first control signal line 40 may be configured to provide the first control signal to the first drive circuit 10 and the second control signal line 50 may be configured to provide the second control signal to the second drive circuit 20. A trace length of the first control signal line 40 is greater than a trace length of the second control signal line 50, and a trace width of the first control signal line 40 is greater than a trace width of the second control signal line 50. In this way, an impedance of the first control signal line 40 and an impedance of the second control signal line 50 can be made comparable, which is advantageous for improving a display uniformity.

Specifically, the first control signal line 40 may include a first trigger signal line 41 and a first clock signal line 42. The first clock signal line 42 may include a first sub-clock signal line 421 and a second sub-clock signal line 422. The first trigger signal line 41 is connected to the first stage of the first shift registers VSR1, and the first trigger signal line 41 is configured for providing the first trigger signal STV1 to the first stage of the first shift registers VSR1. The first sub-clock signal line 421 and the second sub-clock signal line 422 are connected to each of the first shift registers VSR1 for providing the first sub-clock signal CK1 and the second sub-clock signal XCK1 to each of the first shift registers VSR1.

The second control signal line 50 may include a second trigger signal line 51 and a second clock signal line 52. The second clock signal line 52 may include a third sub-clock signal line 521 and a fourth sub-clock signal line 522. The second trigger signal line 51 is connected to the first stage of the second shift registers VSR2, and the second trigger signal line 51 is configured for providing the second trigger signal STV2 to the first stage of the second shift registers VSR2. The third sub-clock signal line 521 and the fourth sub-clock signal line 522 are connected to each of the second shift registers VSR2 for providing the third sub-clock signal CK2 and the fourth sub-clock signal XCK2 to each of the second shift registers VSR2.

A trace length of the first trigger signal line 41 is greater than a trace length of the second trigger signal line 51, and a trace width of the first trigger signal line 41 is greater than a trace width of the second trigger signal line 51.

A trace length of the first sub-clock signal line 421 is greater than a trace length of the third sub-clock signal line 521, and a trace width of the first sub-clock signal line 421 is greater than a trace width of the third sub-clock signal line 521.

A trace length of the second sub-clock signal line 422 is greater than a trace length of the fourth sub-clock signal line 522, and a trace width of the second sub-clock signal line 422 is greater than a trace width of the fourth sub-clock signal line 522.

As an example, as shown in FIG. 24, in a row direction X, the first control signal line 40 and the second control signal line 50 may be on a side of the first shift registers VSR1 and the second shift registers VSR2 away from the display area. That is to say, an orthographic projection of the first control signal line 40 on a light-emitting surface of the display panel and an orthographic projection of the first shift registers VSR1 on the light-emitting surface of the display panel may not overlap, and/or an orthographic projection of the second control signal line 50 on the light-emitting surface of the display panel an orthographic projection of the second shift registers VSR2 on the light-emitting surface of the display panel may not overlap.

As another example, the orthographic projection of the first control signal line 40 on the light-emitting surface of the display panel may overlap the orthographic projection of the first shift registers VSR1 on the light-emitting surface of the display panel, and/or the orthographic projection of the second control signal line 50 on the light-emitting surface of the display panel may overlap the orthographic projection of the second shift registers VSR2 on the light-emitting surface of the display panel. In this way, a narrow border is advantageously achieved.

Illustratively, the orthographic projection of the first control signal line 40 on the light-emitting surface of the display panel may also overlap the orthographic projection of the second shift registers VSR2 on the light-emitting surface of the display panel.

As introduced above, the first control signal line 40 may include the first trigger signal line 41 and the first clock signal line 42. The second control signal line 50 may include the second trigger signal line 51 and the second clock signal line 52.

As an example, the first trigger signal line 41 and the first clock signal line 42 may be located in a same film layer; and/or, the second trigger signal line 51 and the second clock signal line 52 may be located in a same film layer.

Since both the first trigger signal line 41 and the first clock signal line 42 need to be connected to the first drive circuit 10, the two lines being located in a same film layer is convenient for preparation. Similarly, since both the second trigger signal line 51 and the second clock signal line 52 need to be connected to the second drive circuit 20, the two lines being located in a same film layer is convenient for preparation.

Specifically, the first clock signal line 42 may include the first sub-clock signal line 421 and the second sub-clock signal line 422. The first trigger signal line 41, the first sub-clock signal line 421 and the second sub-clock signal line 422 may be located in a same film layer.

Specifically, the second clock signal line 52 may include the third sub-clock signal line 521 and the fourth sub-clock signal line 522. The second trigger signal line 51, the third sub-clock signal line 521, and the fourth sub-clock signal line 522 may be located in a same film layer.

As another example, the first trigger signal line 41 and the first clock signal line 42 may be located in different film layers; and/or, the second trigger signal line 51 and the second clock signal line 52 may be located in different film layers. Since signals transmitted by a trigger signal line and a clock signal line are different, generally, in the same time, a voltage flipping frequency of a clock signal is greater than a voltage flipping frequency of a trigger signal, and arranging the trigger signal line and the clock signal line in different film layers can reduce an interference between the two signal lines.

Specifically, the first clock signal line 42 may include the first sub-clock signal line 421 and the second sub-clock signal line 422. The first sub-clock signal line 421 and the second sub-clock signal line 422 may be located in a same film layer, or the first sub-clock signal line 421 and the second sub-clock signal line 422 may be located in different film layers. The first trigger signal line 41 is located in a different film layer from any one of the first sub-clock signal line 421 and the second sub-clock signal line 422.

Specifically, the second clock signal line 52 may include the third sub-clock signal line 521 and the fourth sub-clock signal line 522. The third sub-clock signal line 521 and the fourth sub-clock signal line 522 may be located in a same film layer, or the third sub-clock signal line 521 and the fourth sub-clock signal line 522 may be located in different film layers. The second trigger signal line 51 and any one of the third sub-clock signal line 521 and the fourth sub-clock signal line 522 are located in different film layers.

Figure 27:
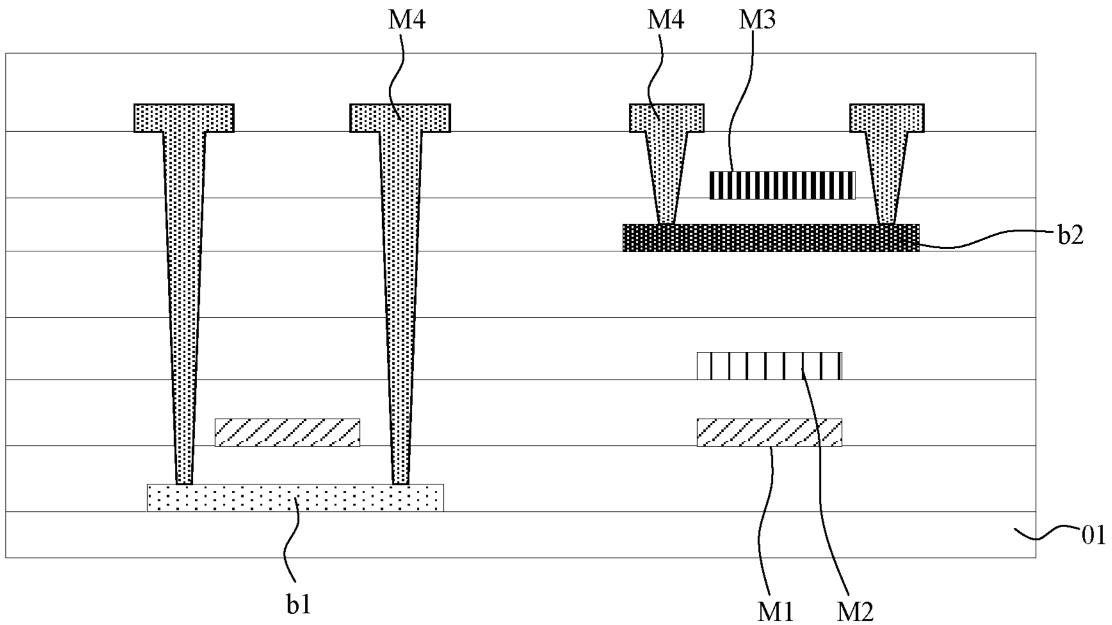
FIG. 27 illustrates a schematic diagram of a film layer structure of a display panel according to an embodiment of the present application.

In some embodiments, as shown in FIG. 27, a film layer structure of a display panel may include a substrate 01, a first semiconductor layer b1, a first metal layer M1, a second metal layer M2, a third metal layer M3, and a fourth metal layer M4 arranged in a stack, adjacent metal layers are arranged to be insulated from each other, and metal layers are arranged to be insulated from the first semiconductor layer b1. As an example, the display panel may be a Low Temperature Polycrystalline Oxide (LTPO) type display panel, and as shown in FIG. 27, the display panel may further comprise a first semiconductor layer b2, wherein the first semiconductor layer b2 may be located between the second metal layer M2 and the third metal layer M3, and the first semiconductor layer b2 is arranged to be insulated from the second metal layer M2 and the third metal layer M3.

In the case where the first trigger signal line 41 and the first clock signal line 42 are located in different film layers, the first trigger signal line 41 may be located in the third metal layer M3, and the first clock signal line 42 may be located in the fourth metal layer M4. The first sub-clock signal line 421 and the second sub-clock signal line 422 may both be located in the fourth metal layer M4.

In the case where the second trigger signal line 51 and the second clock signal line 52 are located in different film layers, the second trigger signal line 51 may be located in the third metal layer M3, and the second clock signal line 52 may be located in the fourth metal layer M4. Both the third sub-clock signal line 521 and the fourth sub-clock signal line 522 may be located in the fourth metal layer M4.

Figure 28:
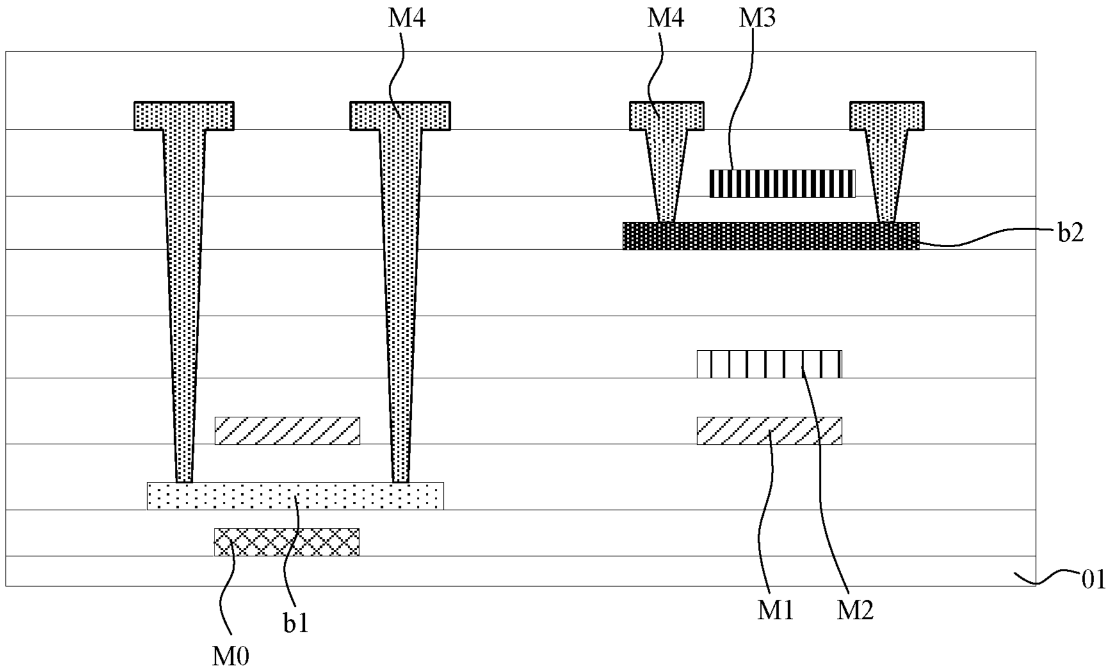
FIG. 28 illustrates a schematic diagram of another film layer structure of a display panel according to an embodiment of the present application.

In other embodiments, as shown in FIG. 28, FIG. 28 differs from FIG. 27 in that the film layer structure of the display panel may further include an auxiliary metal layer MO, the auxiliary metal layer MO is located between the substrate 01 and the first semiconductor layer b1, and the auxiliary metal layer MO is arranged to be insulated from the first semiconductor layer b1.

In the case where the first trigger signal line 41 and the first clock signal line 42 are located in different film layers, the first trigger signal line 41 may be located in the third metal layer M3, and the first clock signal line 42 may be located in the fourth metal layer M4 or the auxiliary metal layer MO. For example, both the first sub-clock signal line 421 and the second sub-clock signal line 422 may be located in the fourth metal layer M4. As another example, both the first sub-clock signal line 421 and the second sub-clock signal line 422 may be located in the auxiliary metal layer MO. As another example, one of the first sub-clock signal line 421 and the second sub-clock signal line 422 may be located in the fourth metal layer M4, and the other may be located in the auxiliary metal layer MO.

In the case where the second trigger signal line 51 and the second clock signal line 52 are located in different film layers, the second trigger signal line 51 may be located in the third metal layer M3, and the second clock signal line 52 may be located in the fourth metal layer M4 or the auxiliary metal layer MO. For example, both the third sub-clock signal line 521 and the fourth sub-clock signal line 522 may be located in the fourth metal layer M4. As another example, both the third sub-clock signal line 521 and the fourth sub-clock signal line 522 may be located in the auxiliary metal layer MO. As another example, one of the third sub-clock signal line 521 and the fourth sub-clock signal line 522 may be located in the fourth metal layer M4, and the other may be located in the auxiliary metal layer MO.

Figure 29:
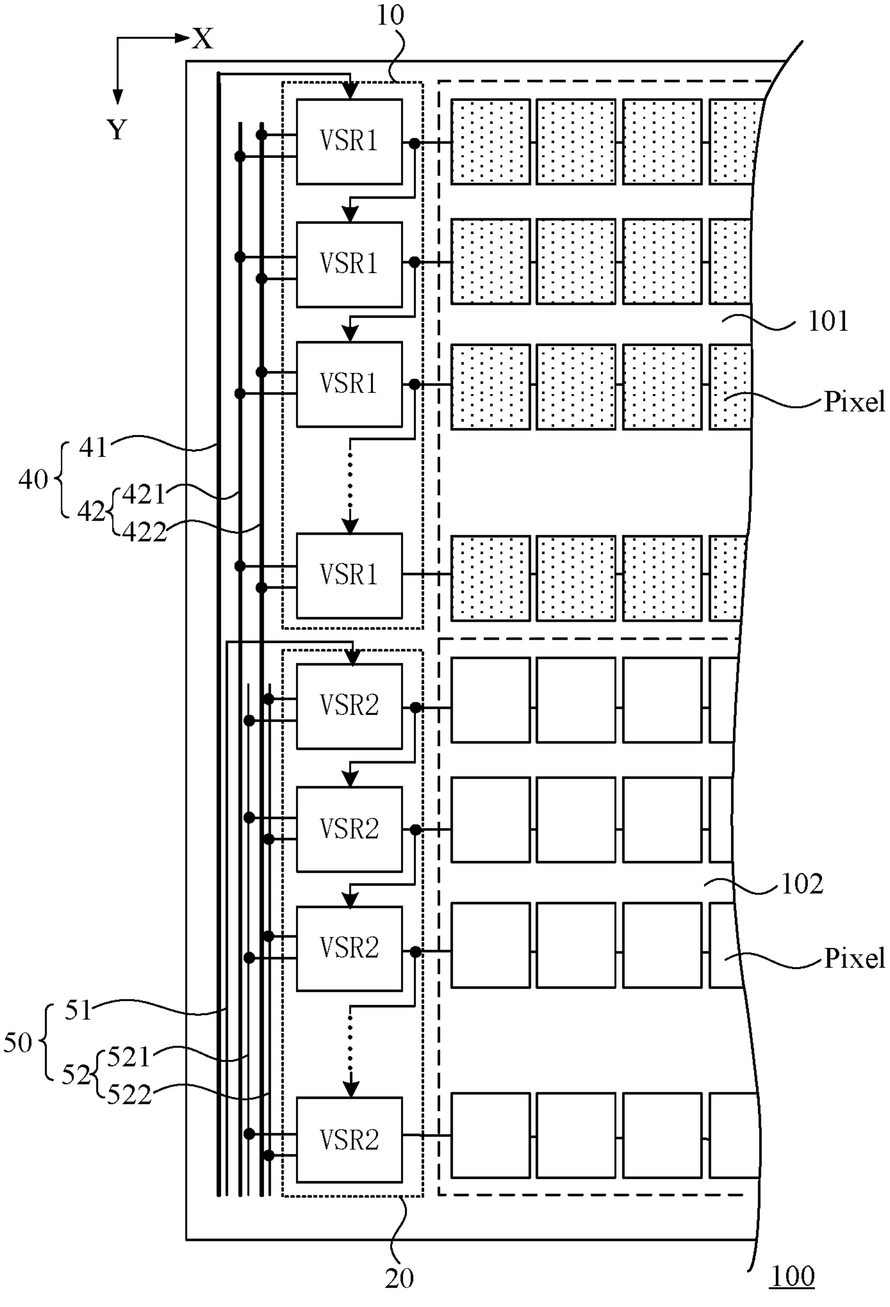
FIG. 29 illustrates a schematic diagram of yet another structure of a display panel according to an embodiment of the present application.

In some embodiments, the first control signal line 40 and the second control signal line 50 may be located in different film layers. As shown in FIG. 29, the orthographic projection of the first control signal line 40 on the light-emitting surface of the display panel may overlap the orthographic projection of the second control signal line 50 on the light-emitting surface of the display panel. In this way, a narrow border is advantageously achieved.

For example, the first trigger signal line 41 and the second trigger signal line 51 may be located in different film layers, and an orthographic projection of the first trigger signal line 41 on the light-emitting surface of the display panel and an orthographic projection of the second trigger signal line 51 on the light-emitting surface of the display panel may overlap.

The first sub-clock signal line 421 and the third sub-clock signal line 521 may be located in different film layers, and an orthographic projection of the first sub-clock signal line 421 on the light-emitting surface of the display panel and an orthographic projection of the third sub-clock signal line 521 on the light-emitting surface of the display panel may overlap.

The second sub-clock signal line 422 and the fourth sub-clock signal line 522 may be located in different film layers, and an orthographic projection of the second sub-clock signal line 422 on the light-emitting surface of the display panel and an orthographic projection of the fourth sub-clock signal line 522 on the light-emitting surface of the display panel may overlap.

Figure 30:
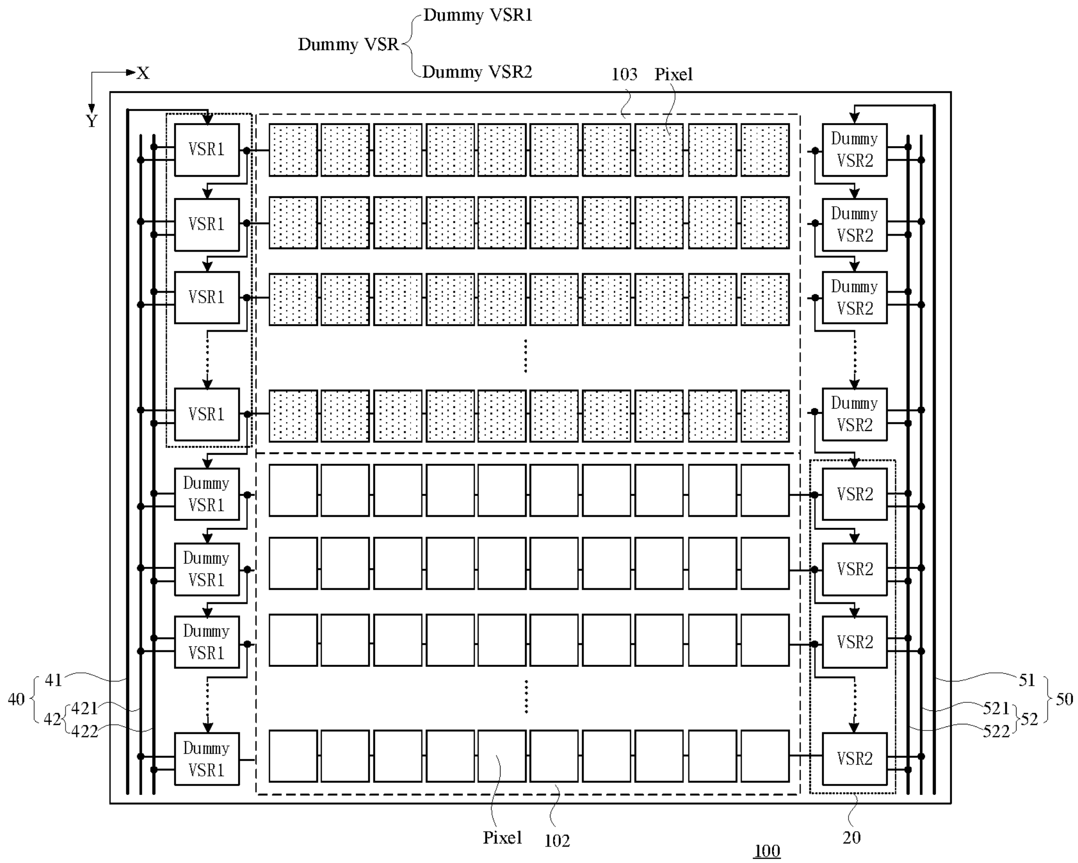
FIG. 30 illustrates a schematic diagram of yet another structure of a display panel according to an embodiment of the present application.

As shown in FIG. 30, the first drive circuit 10 may be located on one side of the display panel in the row direction X, and the second drive circuit 20 may be located on the other side of the display panel in the row direction X. The multi-stage first shift registers VSR of the first drive circuit 10 may be arranged in a column direction Y, and the multi-stage second shift registers VSR2 of the second drive circuit 20 may also be arranged in the column direction Y.

The display panel may further include a first control signal line 40, a second control signal line 50 and a plurality of dummy shift registers Dummy VSR.

The first control signal line 40 is configured to provide the first control signal to the first shift registers VSR1. The second control signal line 50 is configured to provide the second control signal to the second shift registers VSR2.

Dummy shift registers Dummy VSR are distributed on both sides in the row direction X, and a portion of the dummy shift registers Dummy VSR is connected to the first control signal line 40, and a portion of the dummy shift registers Dummy VSR is connected to the second control signal line 50.

In the embodiments of the present application, by providing dummy shift registers, and connecting a portion of the dummy shift registers to the first control signal line, and connecting a portion of the dummy shift registers to the second control signal line, the dummy shift registers and actual shift registers together constitute loads of the first control signal line and the second control signal line, so that loads of the first control signal line and the second control signal line can be balanced, and a signal difference caused by different loads can be reduced, which helps to improve the display effect.

Circuit structures of the dummy shift registers Dummy VSR may be the same as the circuit structures of the first shift registers VSR1 and/or the second shift registers VSR2. The dummy shift registers Dummy VSR are not connected to the pixel circuits Pixel.

With continued reference to FIG. 30, the dummy shift registers Dummy VSR may include first dummy shift registers Dummy VSR1 and second dummy shift registers Dummy VSR2.

The first control signal line 40 connects a number i1 of the first shift registers VSR1 and a number j1 of the first dummy shift registers Dummy VSR1, and the second control signal line 50 connects a number i2 of the second shift registers VSR2 and a number j2 of the second dummy shift registers Dummy VSR2, i1+j1=i2+j2.

In this way, the first control signal line and the second control signal line have the same load, which further reduces a signal difference due to different loads, thereby contributing more to the improvement of the display effect.

Specifically, the first control signal line 40 may include the first trigger signal line 41 and the first clock signal line 42. The first clock signal line 42 may include the first sub-clock signal line 421 and the second sub-clock signal line 422. Both the first sub-clock signal line 421 and the second sub-clock signal line 422 are connected to each of the first dummy shift registers Dummy VSR1. The plurality of first dummy shift registers Dummy VSR1 are cascaded, and an output terminal of the last stage of the first shift registers VSR1 may be connected to a trigger signal input terminal of a first stage of the first dummy shift registers Dummy VSR1. The first drive circuit 10 may be close to the first display area 101 and the plurality of first dummy shift registers Dummy VSR1 may be close to the second display area 102.

The second control signal line 50 may include the second trigger signal line 51 and the second clock signal line 52. The second clock signal line 52 may include the third sub-clock signal line 521 and the fourth sub-clock signal line 522. The plurality of second dummy shift registers Dummy VSR2 are cascaded, and an output terminal of a last stage of the second dummy shift registers Dummy VSR2 may be connected to the trigger signal input terminal of the first stage of the second shift registers VSR2. The second trigger signal line 51 is connected to a trigger signal input terminal of a first stage of the second dummy shift registers Dummy VSR2. The third sub-clock signal line 521 and the fourth sub-clock signal line 522 are each connected to each of the second dummy shift registers Dummy VSR2.

Figure 31:
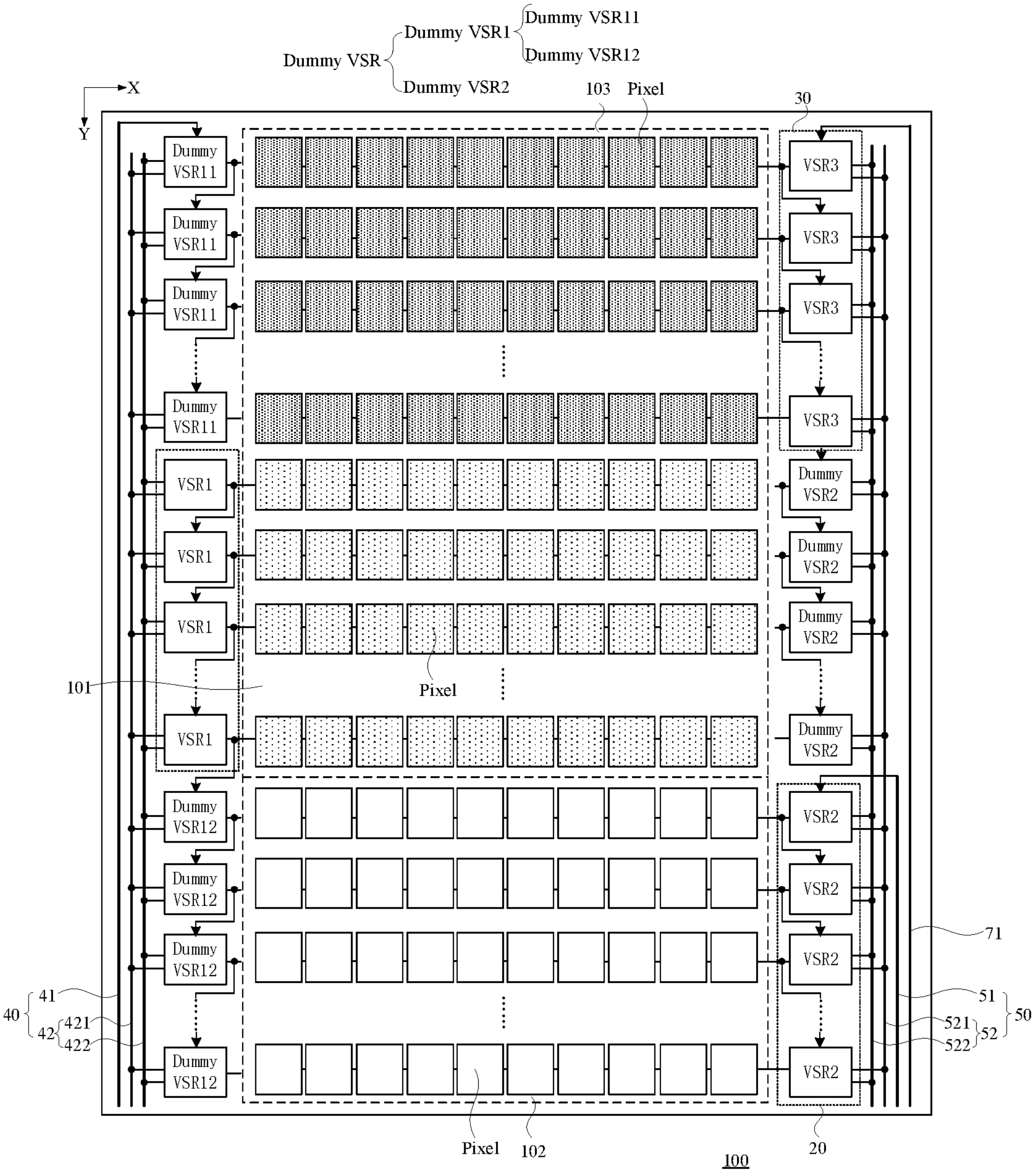
FIG. 31 illustrates a schematic diagram of yet another structure of a display panel according to an embodiment of the present application.

In some embodiments, as shown in FIG. 31, the display panel 100 may further include a third display area 103. A third drive circuit 30 may be provided corresponding to the third display area 103. The third drive circuit 30 includes multi-stage third shift registers VSR3, the third drive circuit 30 is configured for receiving a third control signal, and the third drive circuit 30 provides a third drive signal to the pixel circuits Pixel of the third display area 103.

The first drive circuit 10 may be located on one side of the display panel in the row direction X, the second drive circuit 20 may be located on the other side of the display panel in the row direction X, and the third drive circuit 30 and the second drive circuit 20 are located on the same side of the display panel.

In the column direction Y, the first display area 101 is located between the second display area 102 and the third display area 103. In the column direction Y, both sides of the first drive circuit 10 may be provided with dummy shift registers Dummy VSR, and dummy shift registers Dummy VSR may be provided between the second drive circuit 20 and the third drive circuit 30.

As shown in FIG. 31, a portion above the first drive circuit 10 is referred to as first sub-dummy shift registers Dummy VSR11, a portion below the first drive circuit 10 is referred to as second sub-dummy shift registers Dummy VSR12, the plurality of first sub-dummy shift registers Dummy VSR11 are cascaded, and an output terminal of a last stage of the first sub-dummy shift registers Dummy VSR11 may be connected to the trigger signal input terminal of the first stage of the first shift registers VSR1. The plurality of second sub-dummy shift registers Dummy VSR12 are cascaded, and the output terminal of the last stage of the first shift registers VSR1 may be connected to a trigger signal input terminal of a first stage of the second sub-dummy shift registers Dummy VSR12.

The first control signal line 40 may include the first trigger signal line 41 and the first clock signal line 42. The first clock signal line 42 may include the first sub-clock signal line 421 and the second sub-clock signal line 422. Both the first sub-clock signal line 421 and the second sub-clock signal line 422 are connected to each of the first sub-dummy shift registers Dummy VSR11, and both the first sub-clock signal line 421 and the second sub-clock signal line 422 are connected to each of the second sub-dummy shift registers Dummy VSR12. The first trigger signal line 41 is connected to a trigger signal input terminal of a first stage of the first sub-dummy shift registers Dummy VSR11.

The second control signal line 50 may include the second trigger signal line 51 and the second clock signal line 52. The second clock signal line 52 may include the third sub-clock signal line 521 and the fourth sub-clock signal line 522. Each of the third shift registers VSR3 of the third drive circuit 30 may be connected to both the third sub-clock signal line 521 and the fourth sub-clock signal line 522, that is to say, the third drive circuit 30 and the second drive circuit 20 share a clock signal line.

The second trigger signal line 51 may be connected to the trigger signal input terminal of the first stage of the second shift registers VSR2.

The display panel may further include a third trigger signal line 71 connected to a first stage of the third shift registers VSR3 for providing a third trigger signal to the third shift registers VSR3.

The plurality of second dummy shift registers Dummy VSR2 are cascaded, and an output terminal of a last stage of the third shift registers VSR3 may be connected to a trigger signal input terminal of the second dummy shift registers Dummy VSR2.

Of course, in the case of having three display areas, the control signal lines and the dummy shift registers may be connected in other manners.

Based on the same inventive concept, the embodiments of the present application further provide an integrated chip for providing a signal to the display panel provided by the above-described embodiments. The display panel includes: a first display area and a second display area; a first drive circuit, including multi-stage first shift registers for receiving a first control signal and providing a first drive signal to pixel circuits of the first display area; and a second drive circuit, including multi-stage second shift registers for receiving a second control signal and providing a second drive signal to pixel circuits of the second display area, wherein a pulse change frequency of the first control signal is different from a pulse change frequency of the second control signal; and the integrated chip provides at least one of the first control signal and the second control signal.

It should be noted that in the present embodiment, at least one of the first control signal and the second control signal is provided by the integrated chip, and features of the first control signal and the second control signal in any of the above-mentioned embodiments may be provided by the integrated chip.

Based on the same inventive concept, the embodiments of the present application further provide a display device including the display panel provided by the embodiments of the present application. Therefore, the display device has technical features of the display panel and a driving method thereof provided in the embodiments of the present application, and can achieve beneficial effects of the display panel provided in the embodiments of the present application, and for the same contents, reference may be made to the above-mentioned description of the display panel provided in the embodiments of the present application, which will not be repeated herein.

Figure 32:
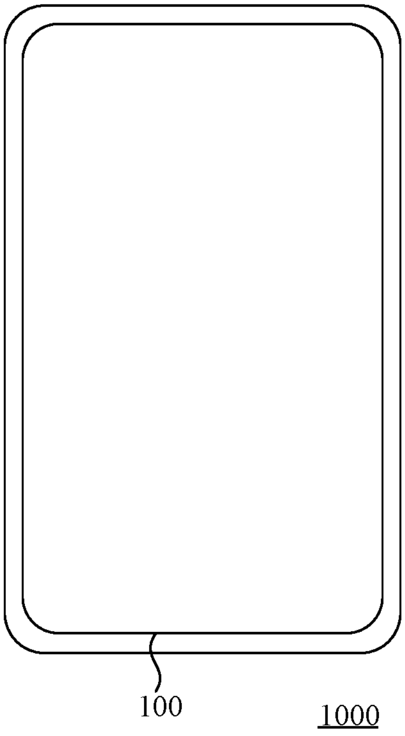
FIG. 32 illustrates a schematic diagram of a structure of a display device according to an embodiment of the present application.

Exemplarily, FIG. 32 illustrates a schematic diagram of a structure of a display device according to an embodiment of the present application. FIG. 32 is a schematic diagram of a structure of a display device provided in an embodiment of the present application. The display device 1000 provided in FIG. 32 includes the display panel 100 provided in any of the embodiments described herein. The embodiment of FIG. 32 only uses a mobile phone as an example to explain the display device 1000, and it can be understood that the display device provided in the embodiments of the present application may be other display devices with a display function, such as a wearable product, a computer, a television and a vehicle-mounted display device, which is not particularly limited in the present application. The display device according to the embodiments of the present application has advantageous effects of the display panel according to the embodiments of the present application, and for the same contents, reference may be made to the detailed description of the display panel according to the above-mentioned embodiments, which will not be described in detail herein.

Pursuant to the embodiments described above in the present application, these embodiments do not describe all the details in detail, nor limit the present application to only the described specific embodiments. Obviously, based on the above description, many modifications and changes can be made. The present specification selects and specifically describes these embodiments, in order to better explain the principle and practical application of the present application, so that those skilled in the art can make good use of the present application and a modified usage on the basis of the present application. The present specification is limited only by the claims and full scope and equivalents thereof.

What is claimed is:

1. A display panel, comprising:

a first display area and a second display area;

a first drive circuit, comprising multi-stage first shift registers for receiving a first control signal and providing a first drive signal to pixel circuits of the first display area; and a second drive circuit, comprising multi-stage second shift registers for receiving a second control signal and providing a second drive signal to pixel circuits of the second display area, wherein a pulse change frequency of the first control signal is different from a pulse change frequency of the second control signal, wherein the first control signal comprises a first trigger signal, the second control signal comprises a second trigger signal, the first display area comprises pixel circuits from row M to row N, the second display area comprises pixel circuits from row P to row Q, an effective data refresh frequency of the pixel circuits from row M to row N is greater than an effective data refresh frequency of the pixel circuits from row P to row Q, and a pulse change frequency of the first trigger signal is greater than a pulse change frequency of the second trigger signal, wherein an effective pulse time length of the first trigger signal is t1, an ineffective pulse time length of the first trigger signal is t2, an effective pulse time length of the second trigger signal is t3, an ineffective pulse time length of the second trigger signal is t4, wherein $$t1 = t3,$$
$$\frac{t1}{t2} > \frac{t3}{t4};$$
or
$$t1 < t3,$$
$$\frac{t1}{t2} = \frac{t3}{t4}.$$

2. The display panel of claim 1, wherein the effective data refresh frequency of the pixel circuits of the first display area is K1 times the effective data refresh frequency of the pixel circuits of the second display area, K1>1, and the pulse change frequency of the first trigger signal is K1 times the pulse change frequency of the second trigger signal.

3. The display panel of claim 1, wherein the effective data refresh frequency of the pixel circuits of the first display area is K1 times the effective data refresh frequency of the pixel circuits of the second display area, $$K1 > 1,$$
$$\frac{t3}{t1} = K1,$$
$$\frac{t4}{t2} = K1.$$

4. The display panel of claim 1, wherein the first control signal further comprises a first clock signal, the second control signal further comprises a second clock signal, and a pulse change frequency of the first clock signal is the same as a pulse change frequency of the second clock signal.

5. The display panel of claim 1, wherein the first control signal comprises a first clock signal, the second control signal comprises a second clock signal, and a pulse change frequency of the first clock signal is different from a pulse change frequency of the second clock signal.

6. The display panel of claim 5, wherein the first display area comprises pixel circuits from row M to row N, the second display area comprises pixel circuits from row P to row Q, an effective data refresh frequency of the pixel circuits from row M to row N is greater than an effective data refresh frequency of the pixel circuits from row P to row Q, and the pulse change frequency of the first clock signal is greater than the pulse change frequency of the second clock signal.

7. The display panel of claim 1, wherein the first control signal further comprises a first clock signal, the second control signal further comprises a second clock signal, and a pulse change frequency of the first clock signal is greater than a pulse change frequency of the second clock signal.

8. The display panel of claim 7, wherein the effective data refresh frequency of the pixel circuits of the first display area is K2 times the effective data refresh frequency of the pixel circuits of the second display area, K2>1;

the pulse change frequency of the first trigger signal is K2 times the pulse change frequency of the second trigger signal;

the pulse change frequency of the first clock signal is K2 times the pulse change frequency of the second clock signal.

9. The display panel of claim 8, wherein an effective pulse time length of the first clock signal is t5, an ineffective pulse time length of the first clock signal is t6, an effective pulse time length of the second clock signal is t7, an ineffective pulse time length of the second clock signal is t8, $$\frac{t7}{t5} = K2,$$

$$\frac{t8}{t6} = K2.$$

10. The display panel of claim 7, wherein an operation process of pixel circuits in the display panel comprises a data writing frame and a holding frame;

a pulse change frequency of the first clock signal in the data writing frame is different from a pulse change frequency of the first clock signal in the holding frame; and/or a pulse change frequency of the second clock signal in the data writing frame is different from a pulse change frequency of the second clock signal in the holding frame.

11. The display panel of claim 10, wherein the pulse change frequency of the first clock signal in the data writing frame is greater than the pulse change frequency of the first clock signal in the holding frame; and/or the pulse change frequency of the second clock signal in the data writing frame is greater than the pulse change frequency of the second clock signal in the holding frame.

12. The display panel of claim 7, wherein an operation process of pixel circuits in the display panel comprises a data writing frame and a holding frame;

in the data writing frame, the pulse change frequency of the first clock signal is different from the pulse change frequency of the second clock signal;

in the holding frame, the pulse change frequency of the first clock signal is the same as the pulse change frequency of the second clock signal.

13. The display panel of claim 1, wherein the display panel further comprises:

a third display area;

a third drive circuit, comprising multi-stage third shift registers for receiving a third control signal and providing a third drive signal to pixel circuits of the third display area;

the pulse change frequency of the first control signal, the pulse change frequency of the second control signal and a pulse change frequency of the third control signal are different.

14. The display panel of claim 1, wherein the display panel further comprises:

a third display area;

a third drive circuit, comprising multi-stage third shift registers for receiving a third control signal and providing a third drive signal to pixel circuits of the third display area;

the first control signal comprises the first trigger signal and a first clock signal, the second control signal comprises the second trigger signal and a second clock signal, and the third control signal comprises a third trigger signal and a third clock signal;

the pulse change frequency of the first trigger signal, the pulse change frequency of the second trigger signal and a pulse change frequency of the third trigger signal are all different;

a pulse change frequency of the first clock signal and a pulse change frequency of the second clock signal are different, and a pulse change frequency of the third clock signal is the same as one of the pulse change frequency of the first clock signal and the pulse change frequency of the second clock signal.

15. An integrated chip for providing a signal to a display panel, wherein the display panel comprises the display panel of claim 1, and the integrated chip provides at least one of the first control signal and the second control signal.

16. A display device comprising a display panel, wherein the display panel comprises the display panel of claim 1.

17. The display panel of claim 5, wherein the first control signal further comprises a first trigger signal, the second control signal comprises a second trigger signal;

a pulse change frequency of the first trigger signal is different from a pulse change frequency of the second trigger signal.

18. The display panel of claim 5, wherein the first control signal further comprises a first trigger signal, the second control signal comprises a second trigger signal;

a pulse change frequency of the first trigger signal is equal to a pulse change frequency of the second trigger signal.

19. The display panel of claim 5, wherein the first control signal line comprises a first trigger signal line and a first clock signal line, and the first control signal comprises a first trigger signal and the first clock signal;

the first trigger signal line and the first clock signal line are located in a same film layer; and/or the second control signal line comprises a second trigger signal line and a second clock signal line, and the second control signal comprises a second trigger signal and the second clock signal;

the second trigger signal line and the second clock signal line are located in a same film layer.

20. The display panel of claim 5, wherein the first control signal line comprises a first trigger signal line and a first clock signal line, and the first control signal comprises a first trigger signal and the first clock signal;

the first trigger signal line and the first clock signal line are located in different film layers; and/or the second control signal line comprises a second trigger signal line and a second clock signal line, and the second control signal comprises a second trigger signal and the second clock signal;

the second trigger signal line and the second clock signal line are located in different film layers.

* * * * *